United States Patent
Sasaki et al.

(10) Patent No.: US 9,592,869 B2
(45) Date of Patent: Mar. 14, 2017

(54) SEAT PERIPHERAL STRUCTURE FOR SADDLE TYPE VEHICLE

(71) Applicant: HONDA MOTOR CO., LTD., Tokyo (JP)

(72) Inventors: Tatsuya Sasaki, Wako (JP); Takaaki Kasai, Wako (JP); Yoshihito Tokuda, Wako (JP); Keita Mikura, Wako (JP); Soya Uchida, Wako (JP); Takayuki Haramoto, Wako (JP); Takatoshi Tatsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 91 days.

(21) Appl. No.: 14/567,702

(22) Filed: Dec. 11, 2014

(65) Prior Publication Data

US 2015/0197298 A1     Jul. 16, 2015

(30) Foreign Application Priority Data

Jan. 10, 2014   (JP) ................................ 2014-003690
Jan. 10, 2014   (JP) ................................ 2014-003691

(51) Int. Cl.
*B62J 1/12*     (2006.01)
*B62K 19/30*    (2006.01)
*B62J 1/28*     (2006.01)

(52) U.S. Cl.
CPC . *B62J 1/12* (2013.01); *B62J 1/28* (2013.01); *B62K 19/30* (2013.01)

(58) Field of Classification Search
CPC ......... B62J 1/12; B62J 1/28; B62J 1/08; B62J 1/02; B62J 1/04; B62K 19/30

USPC ............................ 297/195.12, 215.14, 195.1
See application file for complete search history.

(56) References Cited

U.S. PATENT DOCUMENTS

| | | | | |
|---|---|---|---|---|
| 4,563,038 A | * | 1/1986 | Hirose | B62J 1/12 297/195.12 |
| 5,713,629 A | * | 2/1998 | Plackis | B62J 1/28 297/195.1 |
| 6,070,896 A | * | 6/2000 | Saiki | B62J 1/14 280/288.4 |

(Continued)

FOREIGN PATENT DOCUMENTS

| | | | | |
|---|---|---|---|---|
| FR | 1115212 A | * | 4/1956 | B62J 1/12 |
| FR | 1125764 A | * | 11/1956 | B62J 1/12 |

(Continued)

*Primary Examiner* — Milton Nelson, Jr.
(74) *Attorney, Agent, or Firm* — Birch, Stewart, Kolasch & Birch, LLP

(57) ABSTRACT

A rear seat for a saddle type vehicle that is readily adjustable without changing the position of a main seat to improve the riding comfort of the rear seat. A saddle type vehicle includes a head pipe, a main frame provided behind the head pipe and a seat rail extending to the rear of the main frame. A main seat is provided with a rear seat provided behind the main seat and formed as a separate member from the main seat. The rear seat is attached to a rear seat holding portion provided at a rear portion of the seat rail through a base plate for holding the rear seat thereon. The rear seat can be moved forwardly and rearwardly by making it possible for the base plate to be fixed at a plurality of positions in the forward and rearward direction with respect to the rear seat holding portion.

15 Claims, 26 Drawing Sheets

(56) References Cited

U.S. PATENT DOCUMENTS

| 8,376,455 | B2* | 2/2013 | Inoue | B62J 1/12 |
| | | | | 180/219 |
| 2005/0206204 | A1* | 9/2005 | Ogawa | B62J 1/08 |
| | | | | 297/215.14 |

FOREIGN PATENT DOCUMENTS

| JP | 2011-057069 A | 3/2011 |
| JP | 2013-023064 A | 2/2013 |

\* cited by examiner

SEAT PERIPHERAL STRUCTURE FOR SADDLE TYPE VEHICLE

CROSS-REFERENCE TO RELATED APPLICATIONS

The present application claims priority under 35 USC 119 to Japanese Patent Application No. 2014-003691 filed Jan. 10, 2014 and Japanese Patent Application No. 2014-003690 filed Jan. 10, 2014 the entire contents of which are hereby incorporated by reference.

BACKGROUND OF THE INVENTION

1. Field of the Invention

The present invention relates to a rear seat peripheral structure for a saddle type vehicle. In addition, the present invention relates to a seat peripheral structure for a saddle type vehicle.

2. Description of Background Art

Conventionally, a saddle type vehicle is known which includes an adjustable main seat and a rear seat. See, for example, Japanese Patent Laid-Open No. 2011-57069. In the saddle type vehicle disclosed in Japanese Patent Laid-Open No. 2011-57069, the main seat is attached to a vehicle body through a stair-like portion provided on a seat bottom plate so that the main seat is movable in an upward and downward direction and in a forward and rearward direction.

However, in the conventional seat described above, the height of the main seat is adjusted in order to improve the foot-resting property of a rider, and the stair-like portion is utilized for adjustment of the position of the main seat. Therefore, the conventional seat described above has a problem to be solved in that the structure is complicated. Further, when the main seat is moved in the forward or rearward direction, the main seat is moved also in the upward or downward direction. Also where such a structure as described above is applied to the rear seat, a similar problem occurs. Further, where the rear seat is configured for forward and rearward movement, it is demanded to make it possible to adjust only the position of the rear seat readily without changing the position of the main seat.

In addition, conventionally, a seat peripheral structure for a motorcycle is known wherein a protrusion which projects downwardly is provided on a seat bottom plate and is inserted into an opening provided in a vehicle body frame to carry out the positioning of the seat. See, for example, Japanese Patent Laid-Open No. 2013-23064. Japanese Patent Laid-Open No. 2013-23064 discloses a small size motorcycle including a comparatively small seat with a protrusion that is disposed in the proximity of a seat locking apparatus.

In a conventional seat peripheral structure described above, a fixing portion for locking the seat to the vehicle body and the protrusion for positioning are disposed in the proximity of each other. Therefore, where the seat is formed as a large-sized seat in order to apply the seat peripheral structure to a saddle type vehicle of a large size, the edge of the seat is spaced far away from the protrusion. As a result, a problem arises that the edge of the seat is likely to spread and alignment of the seat with surrounding exterior parts becomes difficult.

SUMMARY AND OBJECTS OF THE INVENTION

The present invention has been made in view of the above circumstances, and it is an object of an embodiment of the present invention to provide a rear seat peripheral structure for a saddle type vehicle wherein the position of a rear seat can be adjusted readily without changing the position of a main seat and the ride comfort of the rear seat can be improved.

In order to achieve the object described above, there is provided a rear seat peripheral structure for a saddle type vehicle which includes a head pipe (12), a main frame (13L, 13R) provided behind the head pipe (12), a seat rail (15L, 15R) extending to the rear of the main frame (13L, 13R), a main seat (45) for being seated by a rider, and a rear seat (46) provided behind the main seat (45) and formed as a separate member from the main seat (45), wherein the rear seat (46) is attached to a rear seat holding portion (112) provided at a rear portion of the seat rail (15L, 15R) through a rear seat base plate (130) which holds the rear seat (46) thereon, and the rear seat (46) can be moved forwardly and rearwardly by making it possible for the rear seat base plate (130) to be fixed at a plurality of positions in a forward and rearward direction with respect to the rear seat holding portion (112).

According to an embodiment of the present invention, by fixing the rear seat base plate to the rear seat holding portion with the position of the rear seat base plate changed to the plurality of positions in the forward and rearward direction, only the rear seat moves forwardly or rearwardly without changing the position of the main seat. Therefore, the rear seat can be readily moved forwardly or rearwardly. Consequently, while the ride comfort of the main seat is assured, the ride comfort of the rear seat can be improved.

Further, according to an embodiment of the present invention, the rear seat peripheral structure for a saddle type vehicle is configured such that the rear seat base plate (130) is disposed between the pair of left and right seat rails (15L, 15R) as viewed in plan and includes a plurality of plate side openings (134) juxtaposed in the forward and rearward direction. The rear seat holding portion (112) is provided at a position on the inner side of the pair of left and right seat rails (15L, 15R) in a vehicle widthwise direction and includes a plurality of openings (113) juxtaposed in the forward and rearward direction. The rear seat base plate (130) and the rear seat holding portion (112) are fixed by a plurality of fastening members (155) fitted in the plate side openings (134) and the openings (113).

According to an embodiment of the present invention, by changing the position at which the plate side openings are fixed by the fastening members with respect to the plurality of openings of the rear seat holding portion juxtaposed forwardly and rearwardly, the rear seat can be readily moved forwardly or rearwardly. Further, since the plurality of fastening members are used for the fixation, the rear seat can be fixed firmly.

Further, according to an embodiment of the present invention, the rear seat peripheral structure for a saddle type vehicle is configured such that a decorative plate (123) for covering the rear seat base plate (130) from above is locked to the rear seat base plate (130).

According to an embodiment of the present invention, even in a state in which the rear seat base plate is moved, the rear seat base plate can be prevented from being exposed by the decorative plate, and the appearance can be improved.

Further, according to an embodiment of the present invention, the rear seat peripheral structure for a saddle type vehicle is configured such that the rear seat base plate (130) has a substantially H-shape as viewed in plan, and the decorative plate (123) is caught by left and right arm portions (148) at a front portion of the rear seat base plate (130) while a rear recessed portion (152) of the decorative plate (123) is locked to the rear seat base plate (130).

According to an embodiment of the present invention, since the decorative plate is caught by the left and right arm portions at the front portion of the rear seat base plate and the rear recessed portion is locked to the rear seat base plate, by locking and unlocking the rear recessed portion, the decorative plate can be removed and mounted readily.

Further, according to an embodiment of the present invention, the rear seat peripheral structure for a saddle type vehicle is configured such that a shaft portion (132) is provided at a front portion of the rear seat base plate (130), and the rear seat (46) can be pivoted to an upright posture around the shaft portion (132) and can be moved forwardly and rearwardly together with the rear seat base plate (130).

With the present invention, by uprightly erecting the rear seat, the rear seat can be used as a back rest for a rider, and by moving the rear seat forwardly or rearwardly in the state of a back rest, the riding comfort to the rider can be adjusted.

Further, according to an embodiment of the present invention, the rear seat peripheral structure for a saddle type vehicle is configured such that a seat belt fastening portion (144) is provided at left and right positions on the outer sides of the shaft portion (132) in the vehicle widthwise direction and a seat belt (143) of the rear seat (46) is fixed to the seat belt fastening portions (144), and the seat belt (143) includes a load hanging hook (143a).

According to an embodiment of the present invention, the seat belt can be prevented from making an obstacle to movement of the rear seat. Further, even in a configuration wherein it is difficult to provide the load hanging hook on the vehicle body side, the load hanging hook can be provided.

Further, according to an embodiment of the present invention, the rear seat peripheral structure for a saddle type vehicle is configured such that the seat rails (15L, 15R) are provided in left and right pair and a cross plate (26) which connects rear ends of the seat rails (15L, 15R) to each other is provided, and a forward projection (115a) is provided at a front end at the center in the vehicle widthwise direction of the cross plate (26) so as to be positioned in a region of a recessed portion (130b) of the rear seat base plate (130) in a state in which the rear seat base plate (130) is positioned at a rearmost end position.

With the present invention, the cross plate can be made longer in the forward and rearward direction by a distance corresponding to the size of the forward projection. Consequently, the strength and the rigidity of the cross plate can be improved.

Further, according to an embodiment of the present invention, the rear seat peripheral structure for a saddle type vehicle is configured such that a rear cover (124) is provided which covers rear portions of the pair of left and right seat rails (15L, 15R), the rear seat base plate (130), the decorative plate (123) and the cross plate (26) from above, and on the rear cover (124), a cover side forward projection (124a) is provided which covers a region of the recessed portion (130b) of the rear seat base plate (130) from above in a state in which the rear seat base plate (130) is positioned at a frontmost end position.

With the present invention, even in a state in which the rear seat base plate is positioned at the frontmost end, the region of the recessed portion of the rear seat base plate can be hidden by the cover side forward projection. Therefore, the appearance is good.

Further, according to an embodiment of the present invention, the rear seat peripheral structure for a saddle type vehicle is configured such that a recessed portion (45d) having a substantially U-shape as viewed in a plan view and in a front elevation view is provided on a rear end edge (75) of the main seat (45), and a front end (46a) of the rear seat (46) and the rear seat base plate (130) are disposed in the recessed portion (45d).

According to an embodiment of the present invention, the length of the main seat and the rear seat in the forward and rearward direction can be suppressed and the height of the rear seat can be made low. Further, by disposing the rear seat base plate in the recessed portion, the rear seat base plate can be hidden. Consequently, the appearance can be improved.

Further, according to an embodiment of the present invention, the rear seat peripheral structure for a saddle type vehicle is configured such that a front end (46a) of the rear seat (46) is disposed at a position at which the front end (46a) overlaps with a rear end of the main seat (45) from above as viewed in plan.

With the present invention, while the main seat is kept fixed, only the rear seat can be moved forwardly and rearwardly.

With the rear seat peripheral structure for a saddle type vehicle according to an embodiment of the present invention, only the rear seat can be readily moved forwardly or rearwardly without changing the position of the main seat. Consequently, while the ride comfort of the main seat is assured, the ride comfort of the rear seat can be improved.

Further, by changing the position at which the plate side openings are fixed by the fastening members, the rear seat can be readily moved forwardly or rearwardly. Further, the rear seat can be fixed firmly.

Further, even in a state in which the rear seat base plate is moved, the rear seat base plate can be prevented from being exposed by the decorative plate, and the appearance can be improved.

Further, by locking and unlocking the rear recessed portion, the decorative plate can be removed and mounted readily.

Further, the rear seat can be used as a back rest for a rider, and the back rest can be moved forwardly or rearwardly to adjust the riding comfort to the rider.

Further, the seat belt can be prevented from making an obstacle to movement of the rear seat. Further, the load hanging hook can be provided by a simple configuration.

Further, the strength and the rigidity of the cross plate can be improved.

Further, the region of the recessed portion of the rear seat base plate can be hidden by the cover side forward projection. Therefore, the appearance is good.

Further, the length of the main seat and the rear seat in the forward and rearward direction can be suppressed and the height of the rear seat can be made low. Further, the rear seat base plate can be hidden in the recessed portion. Consequently, the appearance can be improved.

Further, while the main seat is kept fixed, only the rear seat can be moved forwardly and rearwardly.

The present invention has been made in view of the peripheral structure situation as described above. It is an object of an embodiment of the present invention to suppress spreading of a seat in a seat peripheral structure for a saddle type vehicle so that the seat and exterior parts can be aligned appropriately.

In order to achieve the object described above, there is provided a seat peripheral structure for a saddle type vehicle having a head pipe (12), a pair of left and right main frames (13L, 13R) provided behind the head pipe (12), and pivot plates (14L, 14R) connected to a rear end of the main frames (13L, 13R) and connected to seat rails (15L, 15R). A tank-like member (41) is provided between the pair of left and right main frames (13L, 13R). A main seat (45) for a rider is removably provided behind the tank-like member (41). In the seat peripheral structure for a saddle type vehicle, a first cross frame (23) for connecting the pair of left and right pivot plates (14L, 14R) to each other is provided. A catching mechanism (83) for catching a locking member (77) provided on the main seat (45) is provided on the first cross frame (23). A pair of left and right arm portions (74) extending to side faces from a rear face of the tank-like member (41) are provided on the main seat (45) with a protrusion (78b) projecting downwardly being provided on each of the arm portions (74). When the main seat (45) is attached, the protrusions (78b) are fitted into receiving portions (94) formed at an upper portion of the main frames (13L, 13R).

With the present invention, since the pair of left and right arm portions of the main seat extending to the side faces of the tank-like member are fitted in the receiving portions of the main frames, even if the front end of the main seat and the catching mechanism are spaced from each other, the front end of the main seat can be positioned at the receiving portions. Therefore, spreading of the seat in a transverse direction can be suppressed, and the seat and exterior parts can be aligned with each other appropriately.

Further, the seat peripheral structure for a saddle type vehicle may be configured such that the receiving portions (94) are openings (94), and the openings (94) are provided on connection plates (90) welded to the main frames (13L, 13R).

According to an embodiment of the present invention, by adjusting the position of the connection plates, the position of the receiving portions can be adjusted readily, and the protrusions can be fitted appropriately in the receiving portions.

Further, the seat peripheral structure for a saddle type vehicle may be configured such that the connection plates (90) include a vehicle body cover holding portion (93a) provided integrally thereon in the proximity of the opening (94).

According to an embodiment of the present invention, there is no necessity to provide a vehicle body cover holding portion as a separate part. Thus, the number of parts can be reduced.

Further, the seat peripheral structure for a saddle type vehicle may be configured such that the protrusions (78b) have a substantially square shape as viewed in a plan view, and the openings (94) have a substantially rectangular shape elongated in a forward and rearward direction.

According to an embodiment of the present invention, a reduction in the weight can be anticipated by reducing the plate thickness at the receiving portions or like means. Further, since the openings escape forwardly or rearwardly with respect to the protrusions, management of the accuracy in dimension is facilitated.

Further, the seat peripheral structure for a saddle type vehicle may be configured such that the main seat (45) is inserted and connected at a rear portion thereof in and to a second cross frame (25) provided on the seat rails (15L, 15R) such that, when the main seat (45) is moved around a connection portion (101) thereof, the locking member (77) is fitted with and locked by the catching mechanism (83).

According to an embodiment of the present invention, a front portion of the main seat can be fixed appropriately. Further, since the openings have a rectangular shape while the protrusions have a substantially square shape, an assembly error can be absorbed.

Further, the seat peripheral structure for a saddle type vehicle may be configured such that a rear seat (46) is provided behind the main seat (45), and a recessed portion (45d) of a substantially U-shape as viewed in plan and as viewed in front elevation is provided on a rear end edge (75) of the main seat (45), and besides a front end (46a) of the rear seat (46) is disposed in the recessed portion (45d).

According to an embodiment of the present invention, the length of the main seat and the rear seat in the forward and rearward direction can be suppressed, and the height of the rear seat can be reduced.

With the seat peripheral structure for a saddle type vehicle according to an embodiment of the present invention, spreading of the seat in the transverse direction can be suppressed, and the seat and exterior parts can be aligned appropriately with each other.

Further, the protrusions can be fitted appropriately into the receiving portions.

Further, there is no necessity to provide a vehicle body cover holding portion as a separate part, and the number of parts can be reduced.

Further, reduction in the weight can be anticipated, and management of the accuracy in the dimension of the protrusions and so forth is facilitated.

Further, the front portion of the main seat can be fixed appropriately. Furthermore, an assembly error can be absorbed.

Further, the length of the main seat and the rear seat in the forward and rearward direction can be suppressed, and the height of the rear seat can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, a motorcycle according to an embodiment of the present invention is described with reference to the drawings. It is to be noted that, in the following description, unless otherwise specified, representations of directions such as forward, rearward, leftward, rightward, upward and downward directions are the same as the directions with respect to a vehicle body. Further, reference symbol FR depicted in the figures represents a forward direction of the vehicle body, reference symbol UP represents an upward direction of the vehicle body and reference symbol LE represents a leftward direction of the vehicle body.

Figure 1:
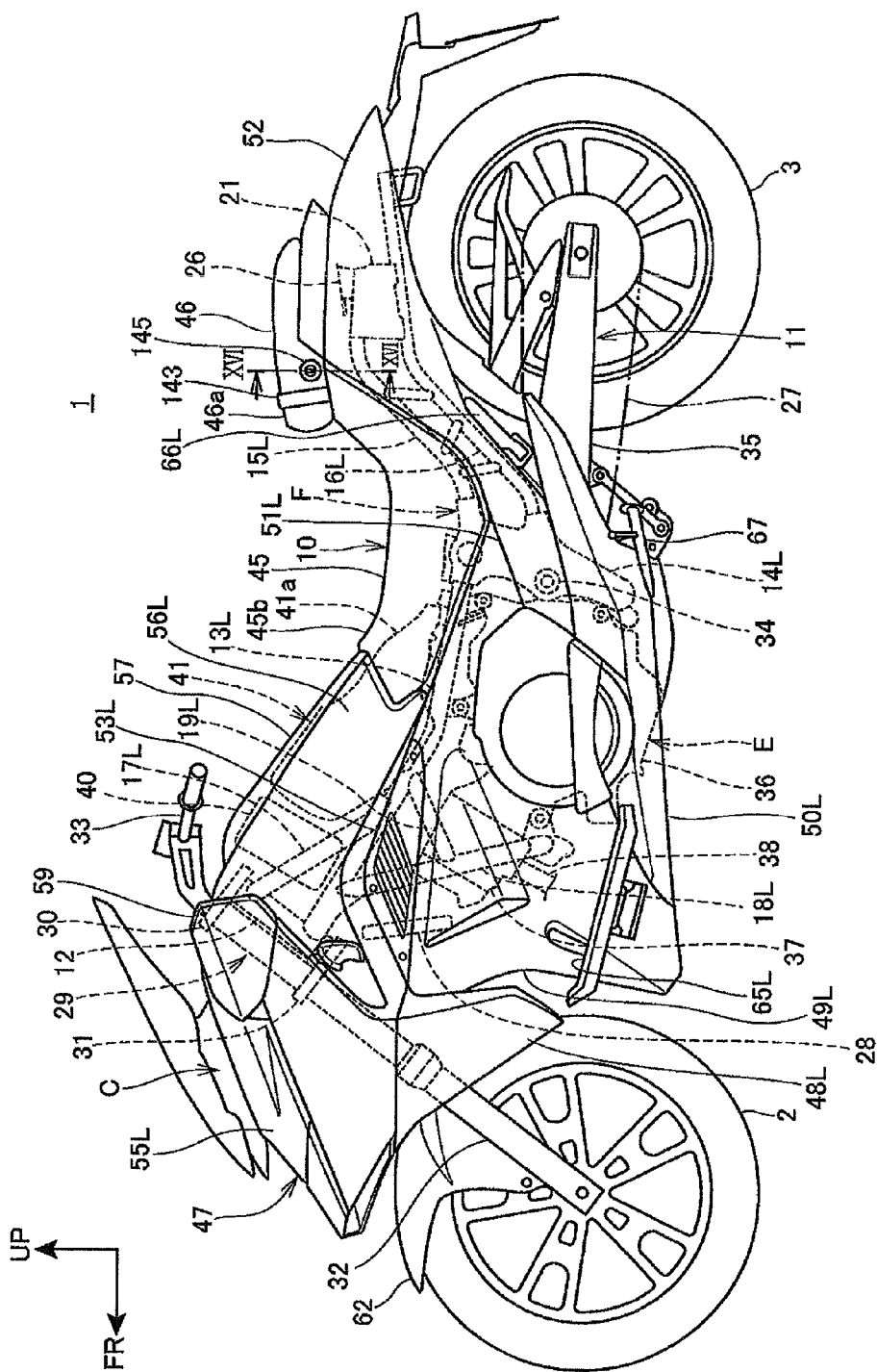
FIG. 1 is a left side elevational view of a motorcycle including a seat peripheral structure of the present invention.
Figure 2:
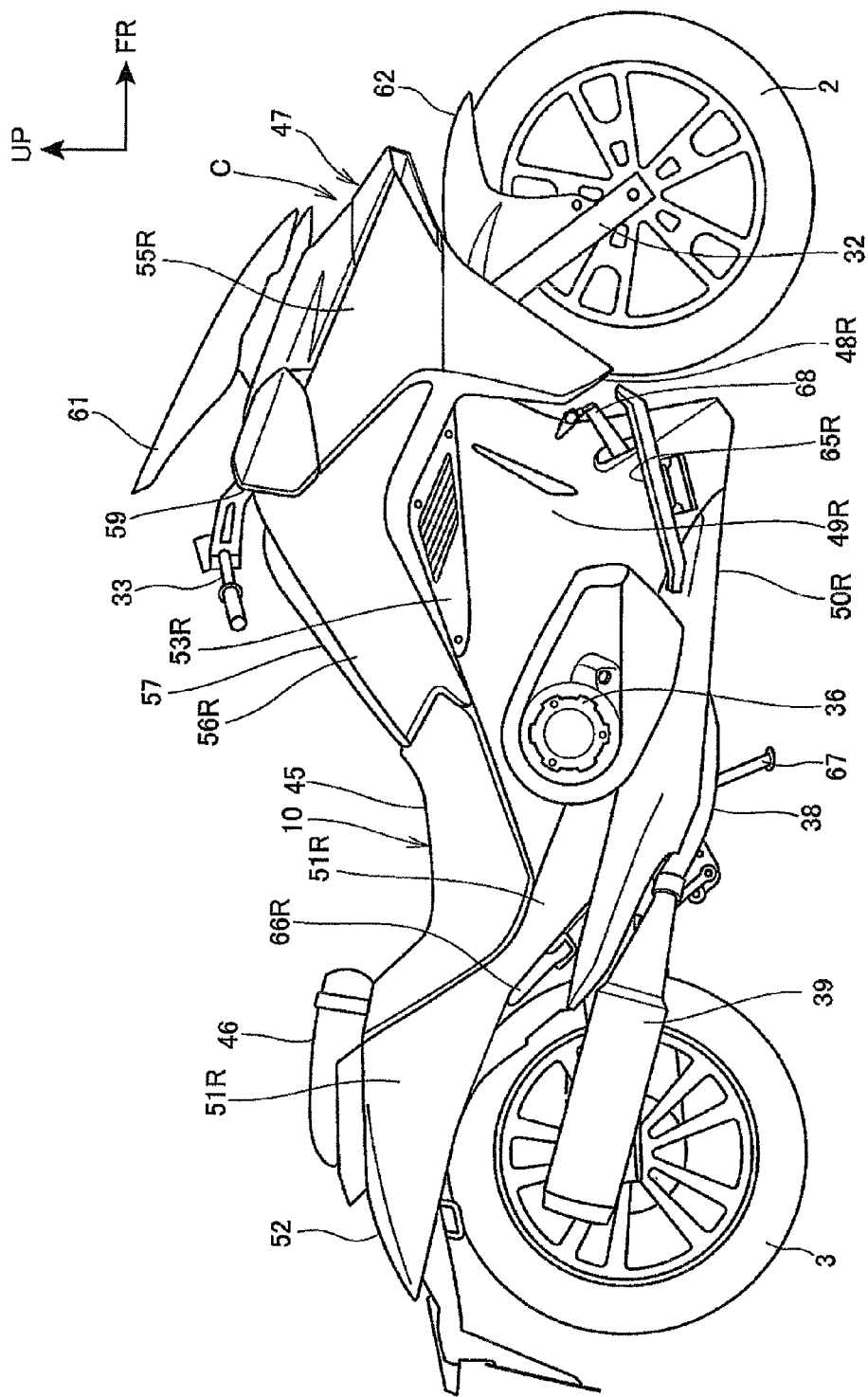
FIG. 2 is a right side elevational view of the motorcycle.
Figure 3:
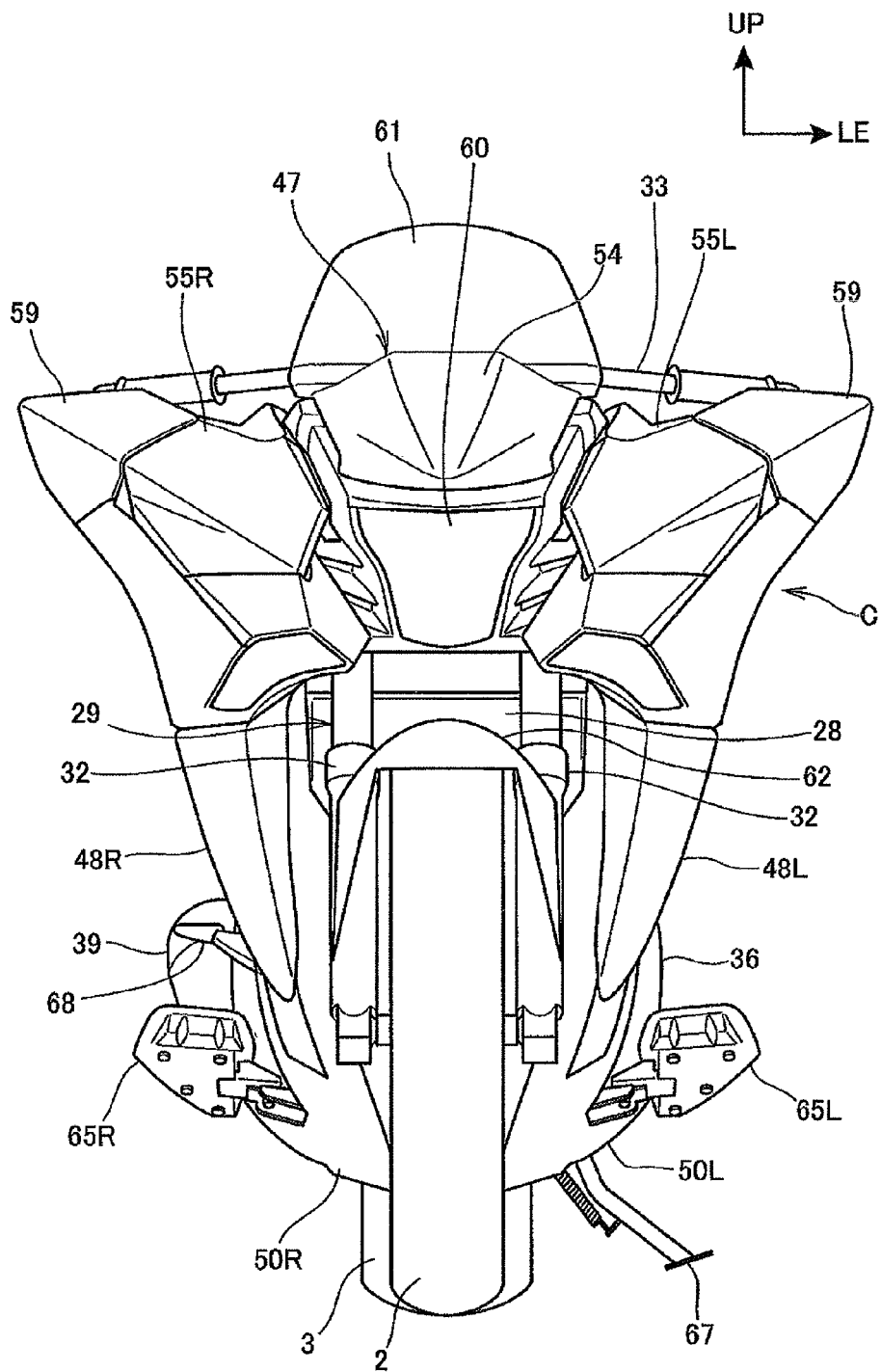
FIG. 3 is a front elevational view of the motorcycle.
Figure 4:
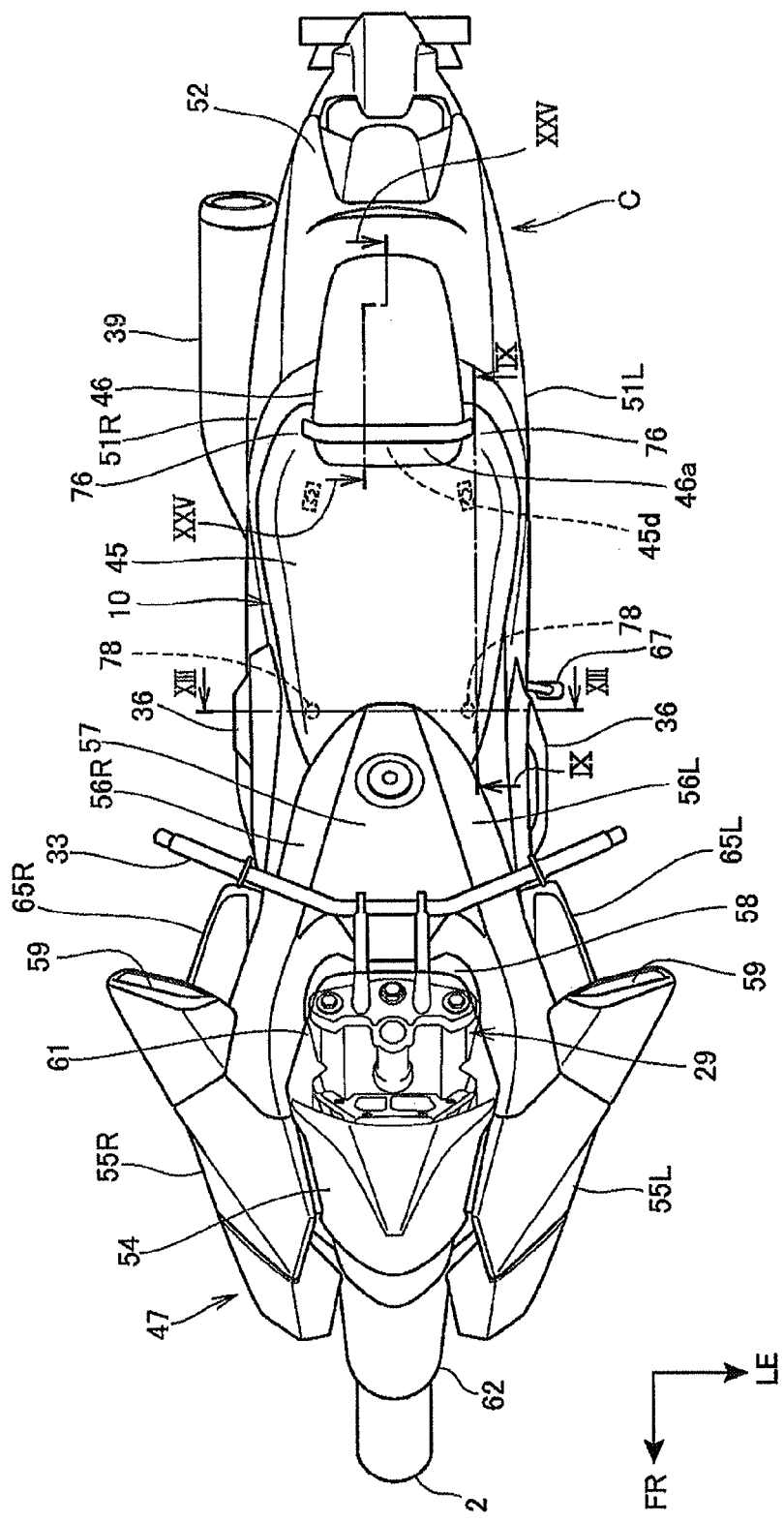
FIG. 4 is a plan view of the motorcycle.

FIG. 1 is a left side elevational view of a motorcycle 1 including the seat peripheral structure of the present invention. FIG. 2 is a right side elevational view of the motorcycle 1. FIG. 3 is a front elevational view of the motorcycle 1. FIG. 4 is a plan view of the motorcycle 1.

Referring to FIGS. 1 to 4, the motorcycle 1 (saddle type vehicle) is a saddle type vehicle wherein an occupant is seated on and across a seat 10. The motorcycle 1 has a front wheel 2 at a front portion of a vehicle body frame F, and a rear wheel 3 which is a driving wheel is supported for rotation on a swing arm 11 disposed at a rear portion of the vehicle. An engine E is supported on the vehicle body frame F in front of the seat 10. The vehicle body frame F is covered at most part thereof with a vehicle body cover C made of resin.

Figure 5:
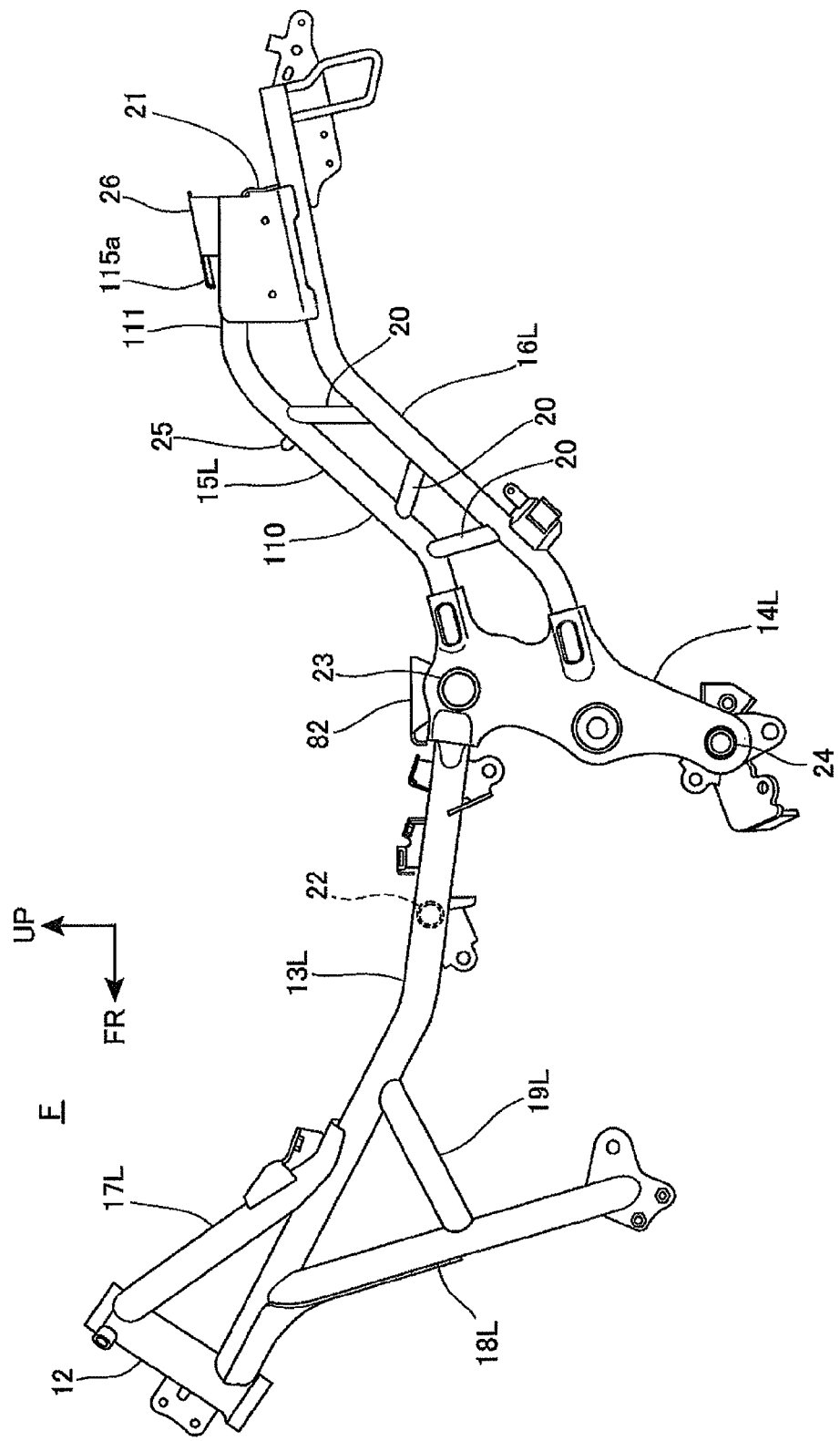
FIG. 5 is a left side elevational view of a vehicle body frame.
Figure 6:
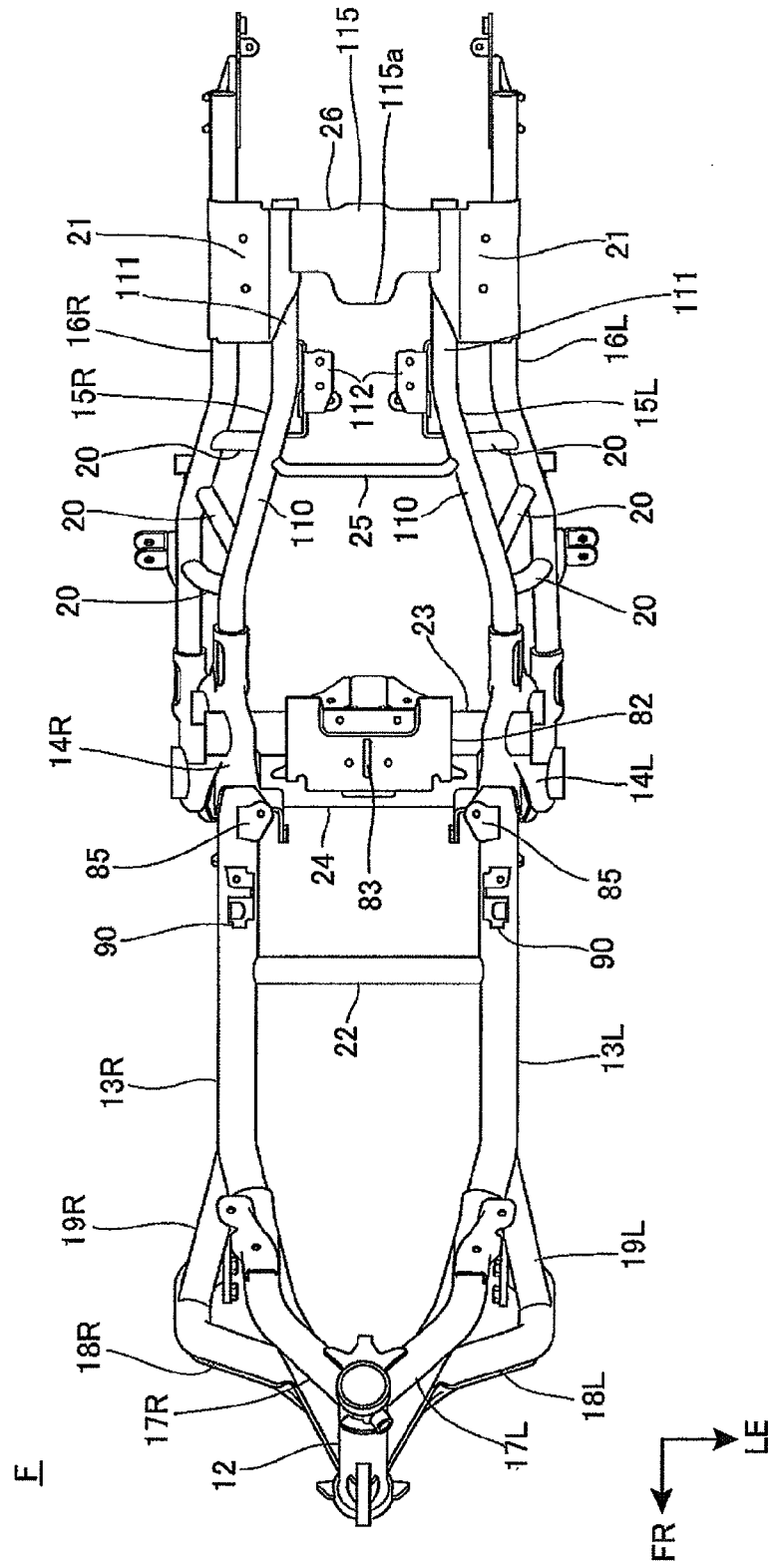
FIG. 6 is a plan view of the vehicle body frame.

FIG. 5 is a left side elevational view of the vehicle body frame F. FIG. 6 is a plan view of the vehicle body frame F.

Referring to FIGS. 1 to 6, the vehicle body frame F is formed from a plurality of pipes or plate members made of metal and connected to each other by welding or the like.

The vehicle body frame F includes a head pipe 12, a pair of left and right main frames 13L and 13R, a pair of left and right pivot frames 14L and 14R (pivot plates), a pair of left and right seat frames 15L and 15R (seat rails), and a pair of left and right rear frames 16L and 16R. The head pipe 12 is provided at a front end of the vehicle body frame F. The main frames 13L and 13R are branched to the left and right from a lower portion of the head pipe 12 and extend rearwardly in a downwardly inclined state. The pivot frames 14L and 14R extend downwardly from rear ends of the main frames 13L and 13R, respectively. The seat frames 15L and 15R extend rearwardly in an upwardly inclined state from an upper portion of the pivot frames 14L and 14R, respectively. The rear frames 16L and 16R extend rearwardly in an upwardly inclined state from a vertically intermediate portion of the pivot frames 14L and 14R and are connected to the seat frames 15L and 15R, respectively.

The vehicle body frame F further includes a pair of left and right gusset frames 17L and 17R, a pair of left and right engine hangers 18L and 18R, and a pair of left and right support frames 19L and 19R. The gusset frames 17L and 17R extend rearwardly in a downwardly inclined state from an upper portion of the head pipe 12 and are connected to a front portion of the main frames 13L and 13R. The engine hangers 18L and 18R extend rearwardly downwardly from a front portion of the main frames 13L and 13R, respectively. The support frames 19L and 19R extend rearwardly in an upwardly inclined state from a vertically intermediate portion of the engine hangers 18L and 18R and are connected to the main frames 13L and 13R, respectively.

The rear frames 16L and 16R are disposed at positions on the outer sides in a vehicle widthwise direction and on the lower side with respect to the seat frames 15L and 15R and extend rearwardly along the seat frames 15L and 15R, respectively. Rear ends of the rear frames 16L and 16R are positioned on the rear side of rear ends of the seat frames 15L and 15R, respectively. The seat frames 15L and 15R and the rear frames 16L and 16R are connected to each other by a plurality of pipe-like reinforcement frames 20, respectively.

Further, the rear ends of the seat frames 15L and 15R and rear portions of the rear frames 16L and 16R are connected to each other by a pair of left and right reinforcement plates 21 provided in such a manner as to cover the seat frames 15L and 15R and the rear frames 16L and 16R from the outer sides in the vehicle widthwise direction.

The vehicle body frame F includes a plurality of cross frames which extend in the vehicle widthwise direction and connect the left and right frames to each other. The cross frames include a front cross frame 22, an upper cross frame 23 (first cross frame), a lower cross frame 24, a rear cross frame 25 (second cross frame), and a plate-like rear end portion cross frame 26 (cross plate). The front cross frame 22 connects the main frames 13L and 13R to each other. The upper cross frame 23 connects upper portions of the pivot frames 14L and 14R to each other. The lower cross frame 24 connects lower portions of the pivot frames 14L and 14R to each other. The rear cross frame 25 connects longitudinal intermediate portions of the seat frames 15L and 15R to each other. The rear end portion cross frame 26 connects rear end portions of the seat frames 15L and 15R to each other. More specifically, left and right ends of the rear end portion cross frame 26 are connected to upper faces of the reinforcement plates 21, respectively.

A steering system 29 for steering the front wheel 2 includes a steering shaft (not depicted) supported for rotation on the head pipe 12, a top bridge 30, a bottom bridge 31, and a pair of left and right front forks 32. The top bridge 30 is connected to an upper end of the steering shaft, and the bottom bridge 31 is connected to a lower end of the steering shaft. The front forks 32 are supported on the top bridge 30 and the bottom bridge 31. A handle bar 33 for steering is provided at an upper portion of the top bridge 30. The front wheel 2 is supported for rotation at a lower end of the front forks 32.

The swing arm 11 is supported for rocking motion by a pivot shaft 34 extending between the left and right pivot frames 14L and 14R. The swing arm 11 includes a pair of left and right arm portions 35, and a connecting portion (not depicted) for connecting front portions of the left and right arm portions 35. The arm portions 35 extend from a front end portion thereof, at which the swing arm 11 is supported for pivotal motion by the pivot shaft 34, to the opposite sides of the rear wheel 3. The rear wheel 3 is supported for rotation at and between rear ends of the left and right arm portions 35.

A rear shock absorber unit (not depicted) extends between the swing arm 11 and the upper cross frame 23.

The engine E is a four-stroke engine including a plurality of parallel cylinders and includes a crankcase 36 and a cylinder unit 37. The crankcase 36 has a crankshaft (not depicted) provided thereon. The cylinder unit 37 extends upwardly in a forwardly inclined relationship from an upper portion of a front portion of the crankcase 36. A transmission (not depicted) for transmitting power of the engine E to the rear wheel 3 side is built in a rear portion of the crankcase 36. Output power of the engine E is transmitted to the rear wheel 3 through a drive chain 27.

The engine E is connected to the engine hangers 18L and 18R, main frames 13L and 13R and pivot frames 14L and 14R and is carried on the vehicle body frame F in a suspended manner. The cylinder unit 37 is disposed between the left and right engine hangers 18L and 18R.

An exhaust pipe 38 is led out from a front face of the cylinder unit 37 and extends rearwardly in a curved manner until it is connected to a muffler 39 disposed on the right side of the rear wheel 3. A radiator 28 for cooling water of the engine E is positioned below the head pipe 12 in front of the cylinder unit 37.

An air cleaner box 40 is disposed above the cylinder unit 37 behind the head pipe 12 and is connected to an intake port of the cylinder unit 37 through a connecting tube (not depicted) and a throttle body (not depicted).

A fuel tank 41 (tank-like member) is provided adjacent to the air cleaner box 40 behind the air cleaner box 40 and supported on the main frames 13L and 13R.

The seat 10 includes a main seat 45 for being seated by a rider, and a rear seat 46 for being seated by a passenger. The main seat 45 is disposed contiguously to a rear portion of the fuel tank 41 and is supported on the main frames 13L and 13R. The rear seat 46 is provided at a position higher by one step than the main seat 45 behind the main seat 45.

A pair of left and right steps 65L and 65R for a rider are disposed below the handle bar 33 in front of the engine E. The rider seated on the main seat 45 places his or her feet thereof on the steps 65L and 65R in such a manner that portions thereof under the knees are bent forwardly and the feet thereof are thrown forward. A brake pedal 68 for operating a brake for the rear wheel 3 is provided in front of the right side step 65R.

The passenger on the rear seat 46 would place the feet thereof on a pair of left and right passenger steps 66L and 66R provided below the rear seat 46.

The vehicle body cover C includes a front cover 47 and a pair of left and right front lower side covers 48L and 48R. The front cover 47 extends from above the front wheel 2 to the fuel tank 41 side to cover a front portion of the vehicle around the head pipe 12 over a wide range. The front lower side covers 48L and 48R extend downwardly from the left and the right of a front portion of the front cover 47 and cover a rear portion of an upper portion of the front wheel 2 from the opposite sides. The vehicle body cover C further includes a pair of left and right center side covers 49L and 49R which extend from the rear side of the front wheel 2 to the pivot frames 14L and 14R and covers the engine E and the pivot frames 14L and 14R from the opposite sides.

The vehicle body cover C further includes a pair of left and right under covers 50L and 50R, and a pair of left and right rear side covers 51L and 51R. The under covers 50L and 50R are connected to a lower edge of the center side covers 49L and 49R and extend from below the engine E to a front portion of the swing arm 11. The rear side covers 51L and 51R cover over regions from the pivot frames 14L and 14R to rear ends of the rear frames 16L and 16R. The vehicle body cover C further includes a tail cover 52, and a pair of left and right ventilation covers 53L and 53R. The tail cover 52 is disposed so as to extend between rear ends of the rear side covers 51L and 51R. The ventilation covers 53L and 53R are provided between a rear portion of the front cover 47 and a front portion of the center side covers 49L and 49R and have a vent therein.

An upper edge of the center side covers 49L and 49R is provided along a lower edge of a rear portion of the front cover 47 and a lower edge of the main seat 45. A front end portion of the rear side covers 51L and 51R is positioned between a rear end portion of the center side covers 49L and 49R and the under covers 50L and 50R.

The crankcase 36 is partly exposed to the left and right sides without being covered with the vehicle body cover C.

The front cover 47 includes a front cover portion 54, a pair of left and right side cover portions 55L and 55R, a pair of left and right tank cover portions 56L and 56R, and an upper cover portion 57. The front cover portion 54 is provided in front of the head pipe 12. The side cover portions 55L and 55R cover a front portion of the head pipe 12 from the front and the opposite sides. The tank cover portions 56L and 56R cover the air cleaner box 40 and the fuel tank 41 from the opposite sides behind the head pipe 12. The upper cover portion 57 has the tank cover portions 56L and 56R connected to the left and the right thereof, respectively, and covers the air cleaner box 40 and the fuel tank 41 from above.

The front cover portion 54, side cover portions 55L and 55R, tank cover portions 56L and 56R and upper cover portion 57 are disposed so as to surround the head pipe 12 from the periphery so as to configure the front cover 47. A space region 58 (FIG. 4) is formed at a central portion of the front cover 47 such that it allows pivotal motion of the steering system 29 in the inside thereof.

A pair of left and right side mirrors 59 are provided integrally on the left and right ends of an upper portion of the side cover portions 55L and 55R, respectively.

A headlamp 60 is provided on the front cover portion 54. A wind screen 61 is provided at a rear portion of the front cover portion 54.

A front fender 62 is fixed to the front forks 32. A side stand 67 is attached to the left side pivot frame 14L. If the motorcycle 1 is placed into a parking state using the side stand 67, then the motorcycle 1 is placed into a state in which it is inclined to the left side.

Figure 7:
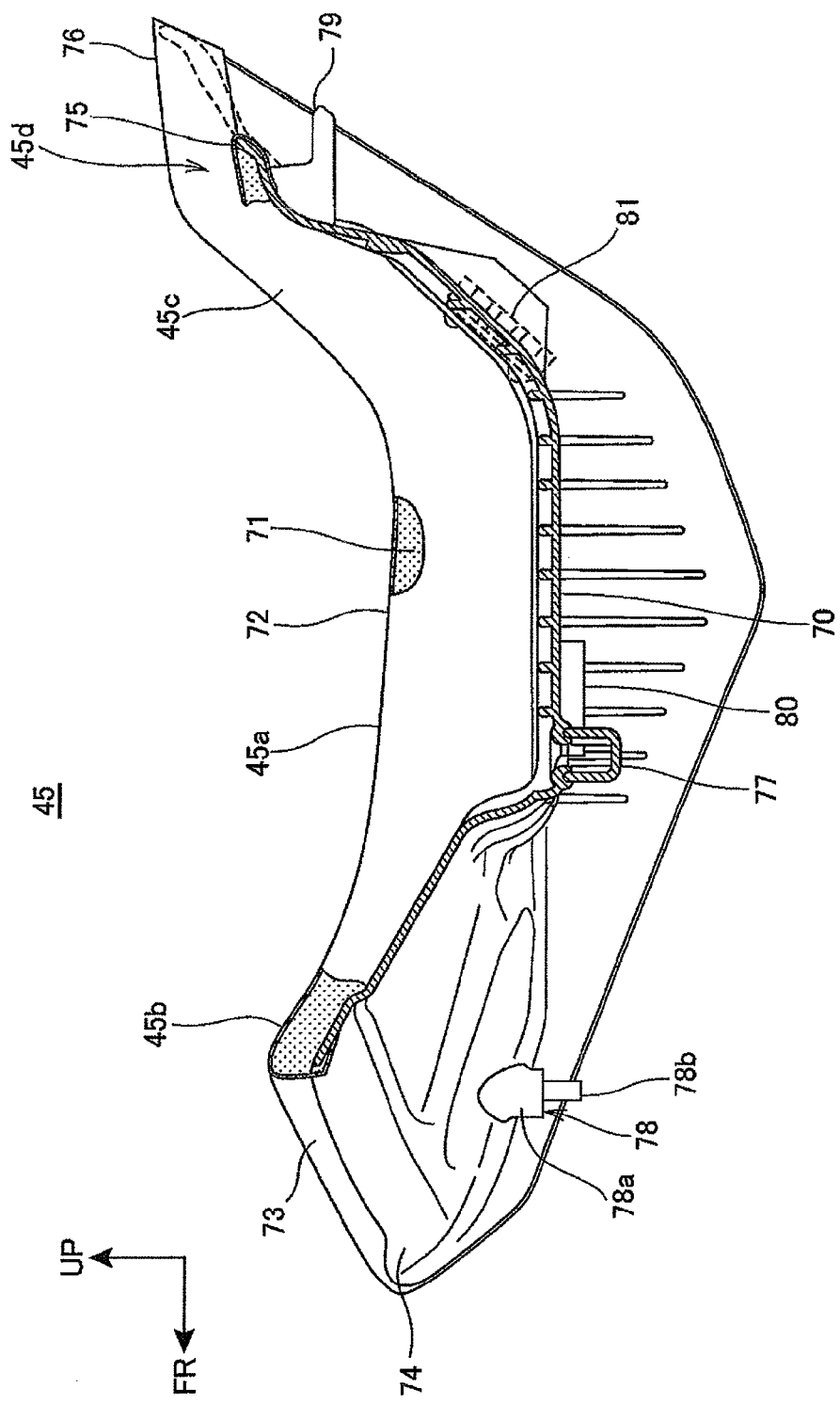
FIG. 7 is a cross sectional view taken at the center of a main seat in a vehicle widthwise direction.
Figure 8:
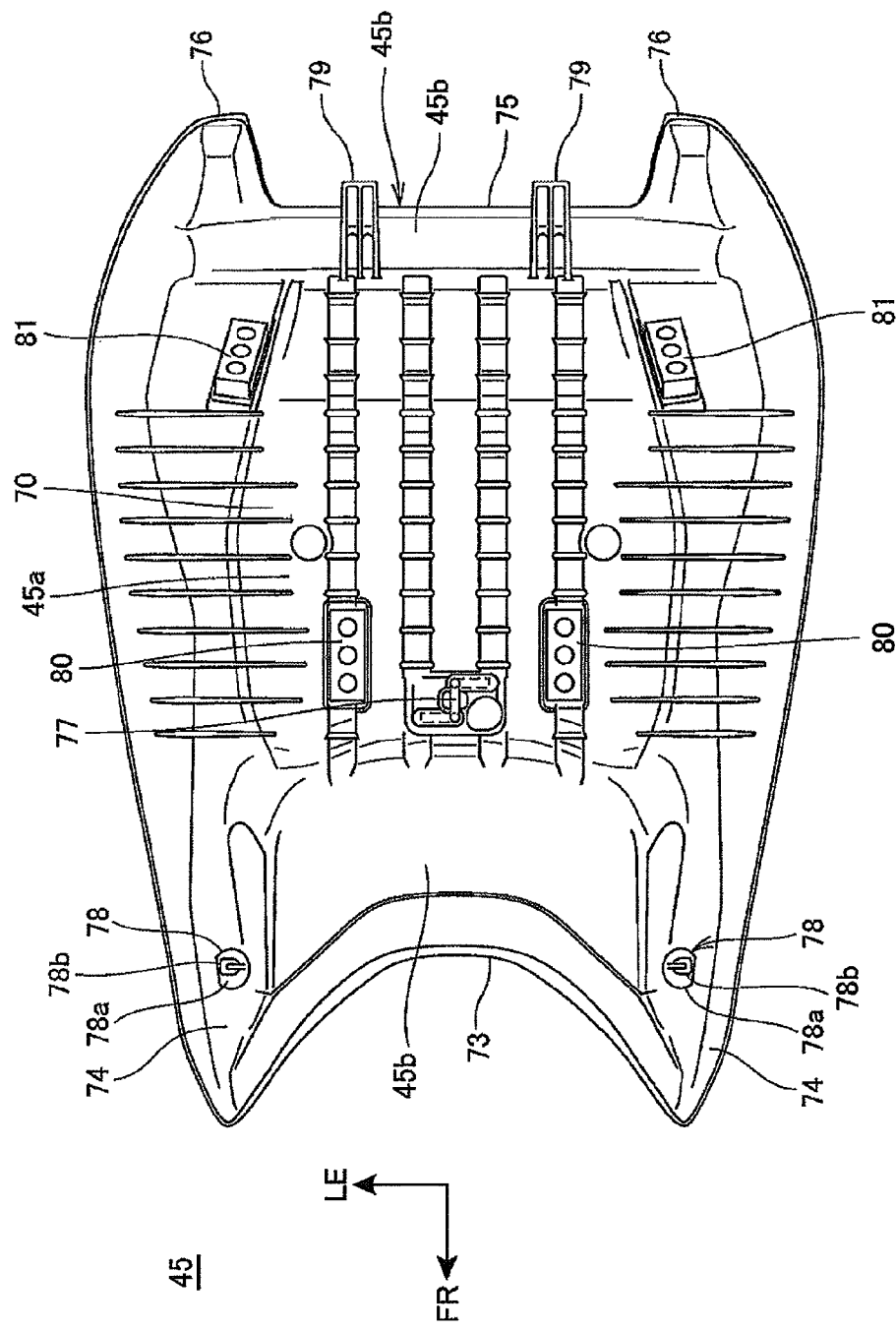
FIG. 8 is a plan view of the main seat as viewed from below.

FIG. 7 is a cross sectional view taken at the center of the main seat 45 in the vehicle widthwise direction. FIG. 8 is a plan view of the main seat 45 as viewed from below.

The main seat 45 includes a seat bottom plate 70 attached to the vehicle body frame F, a cushion 71 supported on the seat bottom plate 70, and a seat cover 72 which covers the cushion 71.

The main seat 45 has a substantially flat seat central portion 45a, a seat front portion 45b and a seat rear portion 45c. The seat central portion 45a is for the rider to sit on. The seat front portion 45b is swollen upwardly in front of the seat central portion 45a. The seat rear portion 45c rises obliquely rearwardly upwardly from the seat central portion 45a. The seat rear portion 45c extends along the seat frames 15L and 15R and extends upwardly farther than the seat front portion 45b.

The fuel tank 41 has a tank rear end portion 41a (FIG. 1) tapering toward the rear end side, and the seat front portion 45b is swollen in the form of a curved face projecting upwardly along the shape of an upper face of the tank rear end portion 41a. A front end edge 73 of the seat front portion 45b is formed in a substantially V shape in plan in which a central portion thereof in the vehicle widthwise direction is depressed rearwardly. Consequently, the opposite end portions of the seat front portion 45b in the vehicle widthwise direction form arm portions 74 extending forwardly. More particularly, the arm portions 74 extend from a rear face (upper face) to the opposite left and right side faces of the tank rear end portion 41a along the tank rear end portion 41a and cover the tank rear end portion 41a from the outer sides.

A rear end edge 75 of the seat rear portion 45c is also an upper end edge of the seat rear portion 45c. The rear end edge 75 is formed in a substantially U-shape in which a central portion thereof in the vehicle widthwise direction is depressed forwardly as viewed in plan and in a substantially U-shape in which a central portion thereof in the vehicle widthwise direction is depressed downwardly as viewed in a front elevation. Consequently, the opposite end portions of the rear end edge 75 of the seat rear portion 45c in the vehicle widthwise direction form a pair of rear projections 76 which project rearwardly and upwardly of the seat rear portion 45c. In particular, on the inner side of the rear projections 76, a rear end side recessed portion 45d (substantially U-shaped recessed portion) is formed such that it is depressed downwardly in a substantially U-shape.

An engaging portion 77 (locking member) is provided at a front end of the seat bottom plate 70 of the seat central portion 45a such that it projects downwardly and engages with the vehicle body frame F side. The engaging portion 77 is provided at a central portion of the main seat 45 in the vehicle widthwise direction.

A pair of projections 78 are provided on the seat bottom plate 70 at the arm portions 74 such that they project to the seat frames 15L and 15R side therebelow. Each of the projections 78 includes a base portion 78a projecting from the seat frame 15L or 15R, and a positioning protrusion 78b (protrusion) formed with a smaller diameter than that of the base portion 78a. The positioning protrusions 78b are positioned behind an apex at a front end of the arm portions 74 as viewed in plan and are positioned forwardly with respect to a rear end of the front end edge 73. The positioning protrusions 78b are formed in a substantially square shape as viewed in plan and as viewed in an axial direction.

A pair of locking portions 79 are provided on the seat bottom plate 70 which is part of the seat rear portion 45c such that they project rearwardly and are locked by the vehicle body frame F side. The locking portions 79 are disposed in an upper portion of the seat rear portion 45C, below the rear projections 76, and on the inner side in the vehicle widthwise direction with respect to the rear projections 76.

A pair of abutting portions 80 are provided on the seat bottom plate 70 sidewardly of the engaging portion 77 such that they abut with the vehicle body frame F. Also on the seat bottom plate 70 which is part of the seat rear portion 45c, a pair of abutting portions 81 are provided such that they abut with the vehicle body frame F.

Figure 9:
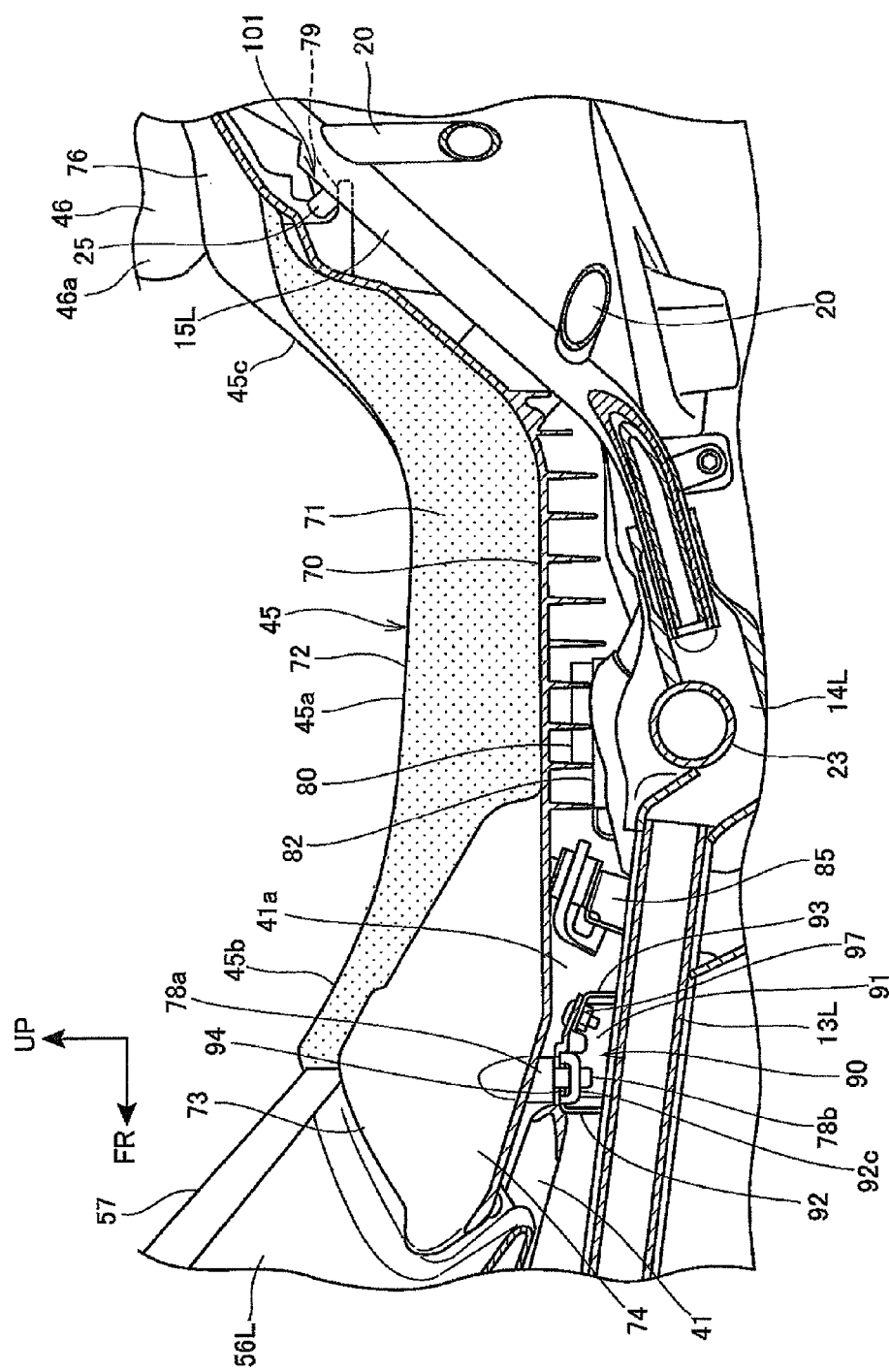
FIG. 9 is a sectional view taken along line IX-IX of FIG. 4.
Figure 10:
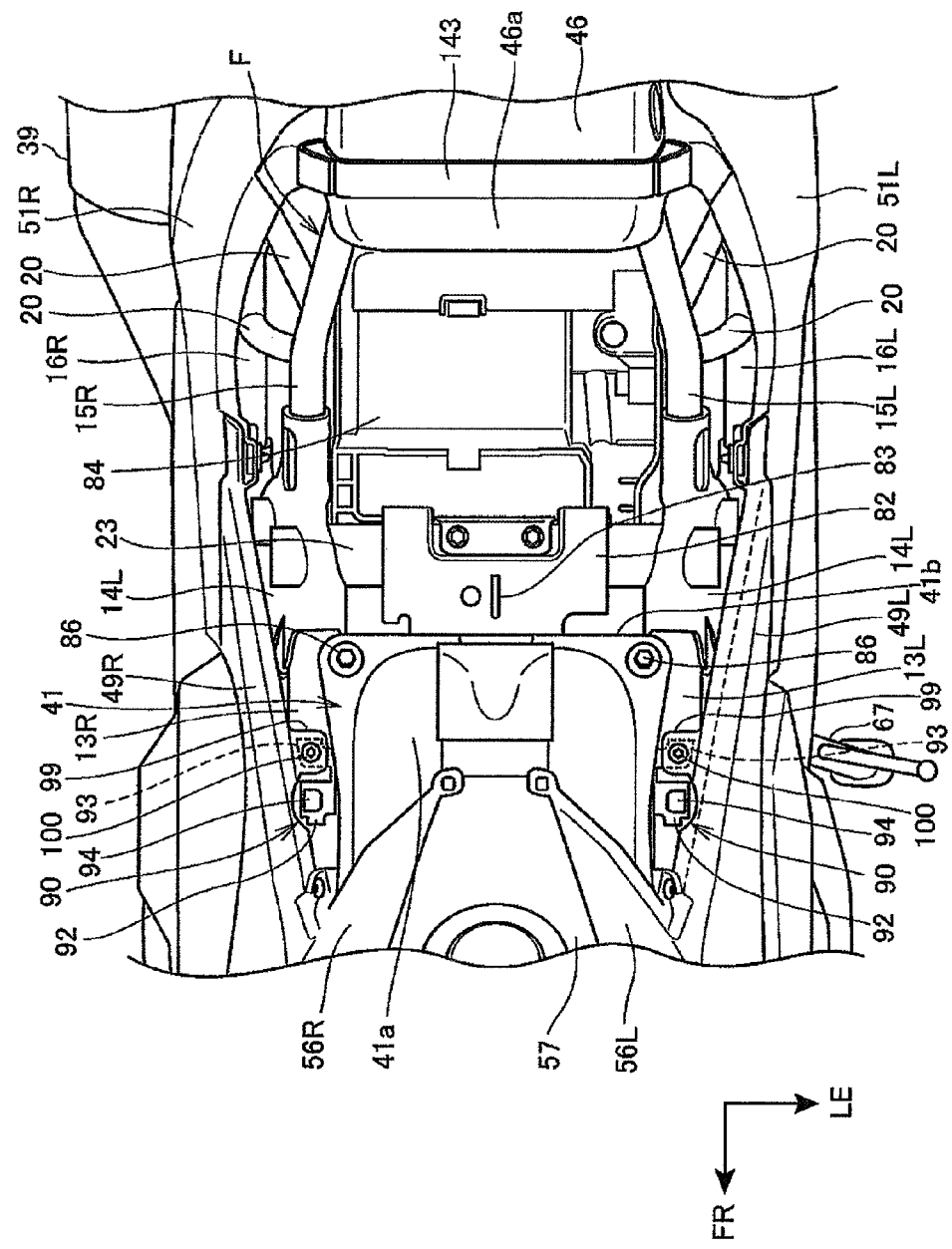
FIG. 10 is a plan view of a periphery of an upper cross frame in a state in which the main seat is removed.

FIG. 9 is a sectional view taken along line IX-IX of FIG. 4. FIG. 10 is a plan view around the upper cross frame 23 in a state in which the main seat 45 is removed.

As depicted in FIGS. 9 and 10, a plate-like seat receiving portion 82 is provided at an intermediate portion of an upper face of the upper cross frame 23 in the vehicle widthwise direction. A catching mechanism portion 83 (catching mechanism) is provided on the seat receiving portion 82 such that it is engaged by the engaging portion 77 of the main seat 45. If the engaging portion 77 is engaged with the catching mechanism portion 83, then the engaging portion 77 is locked in the catching mechanism portion 83 thereby to fix the main seat 45 to the vehicle body frame F.

A tray 84 into which articles and so forth can be accommodated is disposed between the upper cross frame 23 and the rear seat 46.

Tank stays 85 (FIG. 6) are provided on the main frames 13L and 13R in the proximity of a front portion of the upper cross frame 23. The fuel tank 41 is fixed at a rear end portion thereof to the tank stays 85 by bolts 86.

At positions of the main frames 13L and 13R on the front side of the catching mechanism portion 83, a pair of connection plates 90 are provided such that the positioning protrusions 78b of the main seat 45 are fitted therewith. The connection plates 90 are disposed in a space covered from above with the arm portions 74 of the main seat 45. The connection plates 90 are provided on an upper face of the main frames 13L and 13R and are disposed, on the front side with respect to a rear edge 41b of the fuel tank 41, between the tank cover portions 56L and 56R and the tank stays 85 in the forward and rearward direction. Further, the connection plates 90 are disposed, as viewed in a plan view, on the outer sides in the vehicle widthwise direction with respect to the left and right side edges of the tank rear end portion 41a.

Figure 11A:
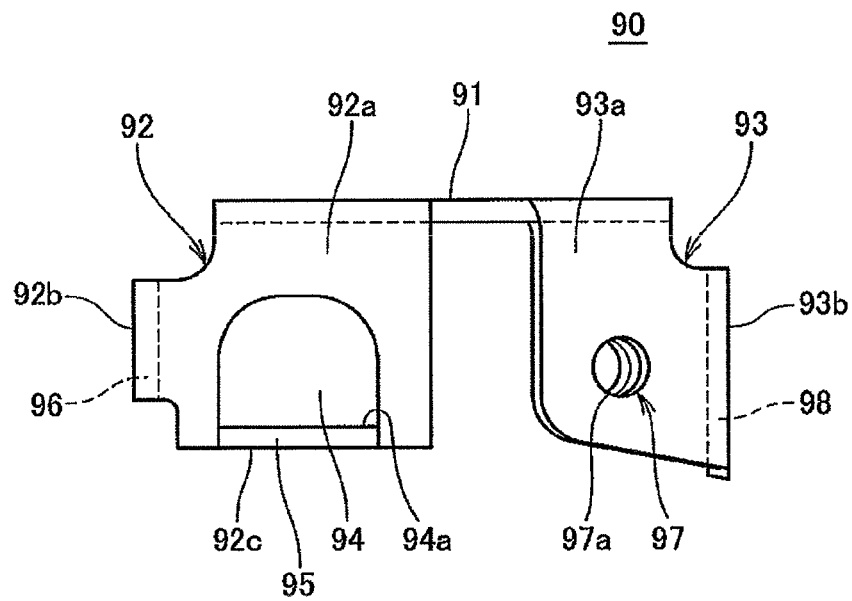
FIGS. 11(a) and 11(b) are views depicting a connection plate, wherein 11(a) is plan view and 11(b) is a side elevational view.
Figure 11B:
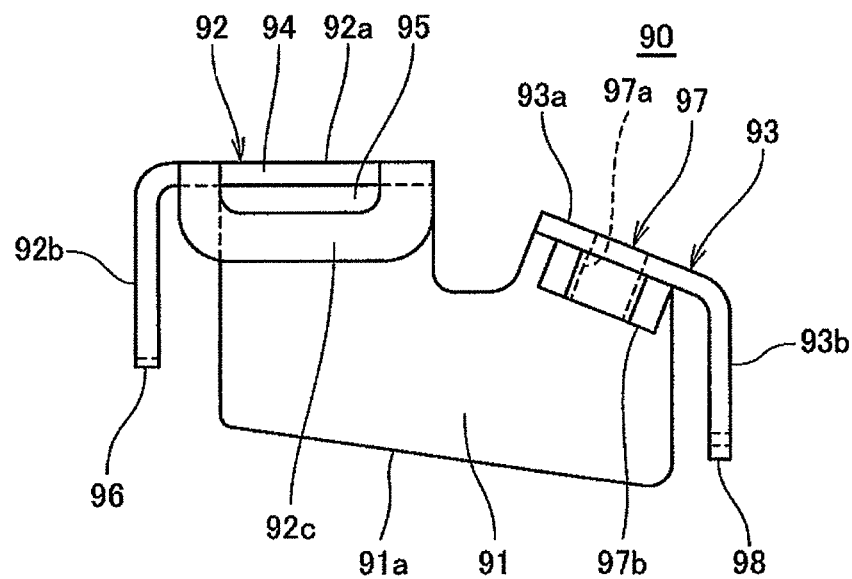

FIG. 11 depicts a connection plate 90, wherein (a) is a plan view and (b) is a side elevational view. Since the connection plates 90 are formed in leftwardly and rightwardly symmetrical shapes to each other, the left side connection plate 90 is described with reference to FIG. 11.

Referring to FIGS. 9 to 11, the connection plate 90 includes a vertical plate portion 91, a front flat plate portion 92, and a rear flat plate portion 93. The vertical plate portion 91 extends in the forward and rearward direction and in the upward and downward direction of the vehicle. The front flat plate portion 92 extends substantially horizontally in a bent state from an upper edge of a front portion of the vertical plate portion 91 to the outer side in the vehicle widthwise direction. The rear flat plate portion 93 extends in a bent state from an upper edge of a rear portion of the vertical plate portion 91 to the outer side in the vehicle widthwise direction. A gap is provided in the forward and rearward direction between the front flat plate portion 92 and the rear flat plate portion 93. The connection plate 90 is formed by carrying out, for example, a bending work or a drilling process of a metal plate by a press work or the like.

The front flat plate portion 92 includes a horizontal portion 92a extending substantially horizontally, a front plate portion 92b and a side plate portion 92c. The front plate portion 92b is bent from a front edge of the horizontal portion 92a and extends downwardly. The side plate portion 92c is bent from a side edge on the outer side of the horizontal portion 92a in the vehicle widthwise direction and extends downwardly. A positioning opening 94 (receiving portion, opening) is formed in the horizontal portion 92a and has a substantially rectangular shape elongated in the forward and rearward direction. A positioning protrusion 78b of the main seat 45 is fitted into the positioning opening 94. Further, a side face opening 95 is formed in a contiguous relationship to the positioning opening 94 at an upper end of the side plate portion 92c.

In particular, the positioning opening 94 and the side face opening 95 are formed by forming an opening in the horizontal portion 92a before the side plate portion 92c is bent and then bending the side plate portion 92c downwardly at a position midway of the opening. Consequently, the two front and rear corner portions on the outer side of a peripheral edge portion of the positioning opening 94 as viewed in plan can be formed as corner portions of a substantially right angle, and an outer side edge 94a of the peripheral edge portion of the positioning opening 94 can be formed in an elongated linear shape. The outer side edge 94a extends straightforwardly in the forward and rearward direction of the vehicle.

A lower edge 96 of the front plate portion 92b is a joining portion to be welded to the main frame 13L and is formed in an arcuate shape in accordance with the shape of an upper face of the pipe-like main frame 13L.

The rear flat plate portion 93 of the connection plate 90 includes a cover holding plate portion 93a (vehicle body cover holding portion) formed in the form of a rearwardly downwardly inclined face, and a rear plate portion 93b bent from a rear edge of the cover holding plate portion 93a and extending downwardly.

The cover holding plate portion 93a includes a fixing hole portion 97 to which the center side cover 49L is fixed. The fixing hole portion 97 includes a hole 97a formed in the cover holding plate portion 93a, and a nut portion 97b provided on a lower face of the cover holding plate portion 93a.

A lower edge 98 of the rear plate portion 93b is a joining portion to be welded to the main frame 13L and is formed in an arcuate shape in accordance with the shape of an upper face of the pipe-like main frame 13L.

A lower edge 91a of the vertical plate portion 91 is a joining portion to be welded to an upper face of the main frame 13L and is formed in a rearwardly downwardly inclined state so as to extend along the main frame 13L.

As depicted in FIG. 10, each of the center side covers 49L and 49R includes a stay portion 99 extending to the inner side in the vehicle widthwise direction from an upper edge portion thereof. The stay portion 99 is set on the rear plate portion 93b of the connection plate 90 and is fastened to the fixing hole portion 97 of the cover holding plate portion 93a by a cover fixing bolt 100 fitted from above in the stay portion 99.

An assembly procedure of the main seat 45 is described with reference to FIGS. 9 and 10.

When the main seat 45 is to be attached to the vehicle body, the locking portions 79 at rear portions of the main seat 45 are first caught from the front by the rear cross frame 25. Consequently, a connection portion 101 at which the locking portions 79 are locked to the rear cross frame 25 is formed. Then, as the main seat 45 is pivoted downwardly around the connection portion 101, the engaging portion 77 of the main seat 45 is engaged with the catching mechanism portion 83 and the positioning protrusions 78b of the main seat 45 are fitted into the positioning openings 94 of the connection plates 90.

Consequently, the engaging portion 77 is locked to the catching mechanism portion 83 to fix the main seat 45 to the catching mechanism portion 83 and the positioning protrusions 78b are positioned in the positioning openings 94. Consequently, the arm portions 74 at the front end of the main seat 45 are positioned with respect to the main frames 13L and 13R.

Further, the base portions 78a of the projections 78 do not abut with the upper face of the connection plates 90, and the load of the main seat 45 in the upward and downward direction is received by other locations such as the abutting portions 80 and 81 of the seat bottom plate 70.

Figure 12:
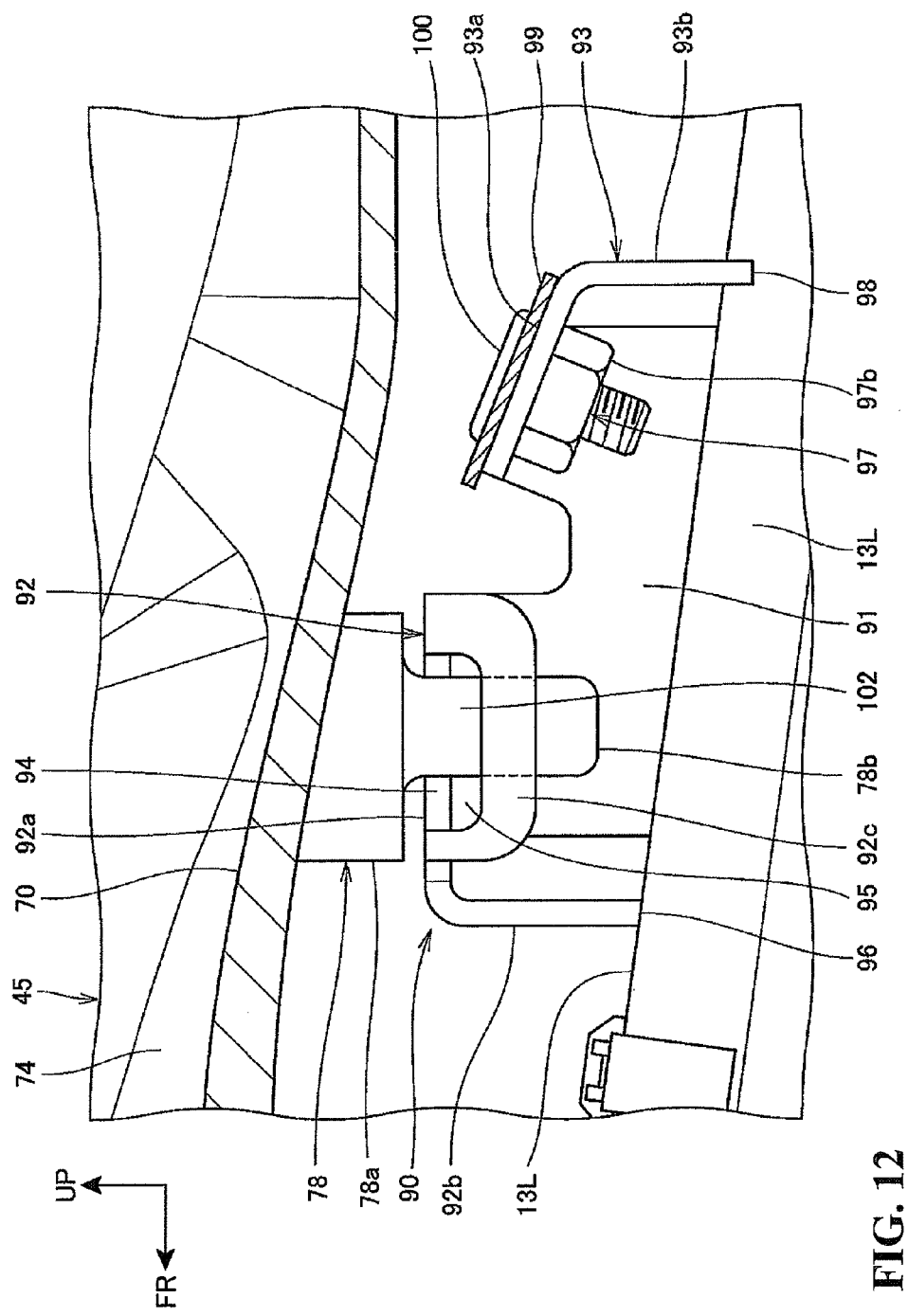
FIG. 12 is an enlarged view of a peripheral portion of the connection plate in FIG. 9.
Figure 13:
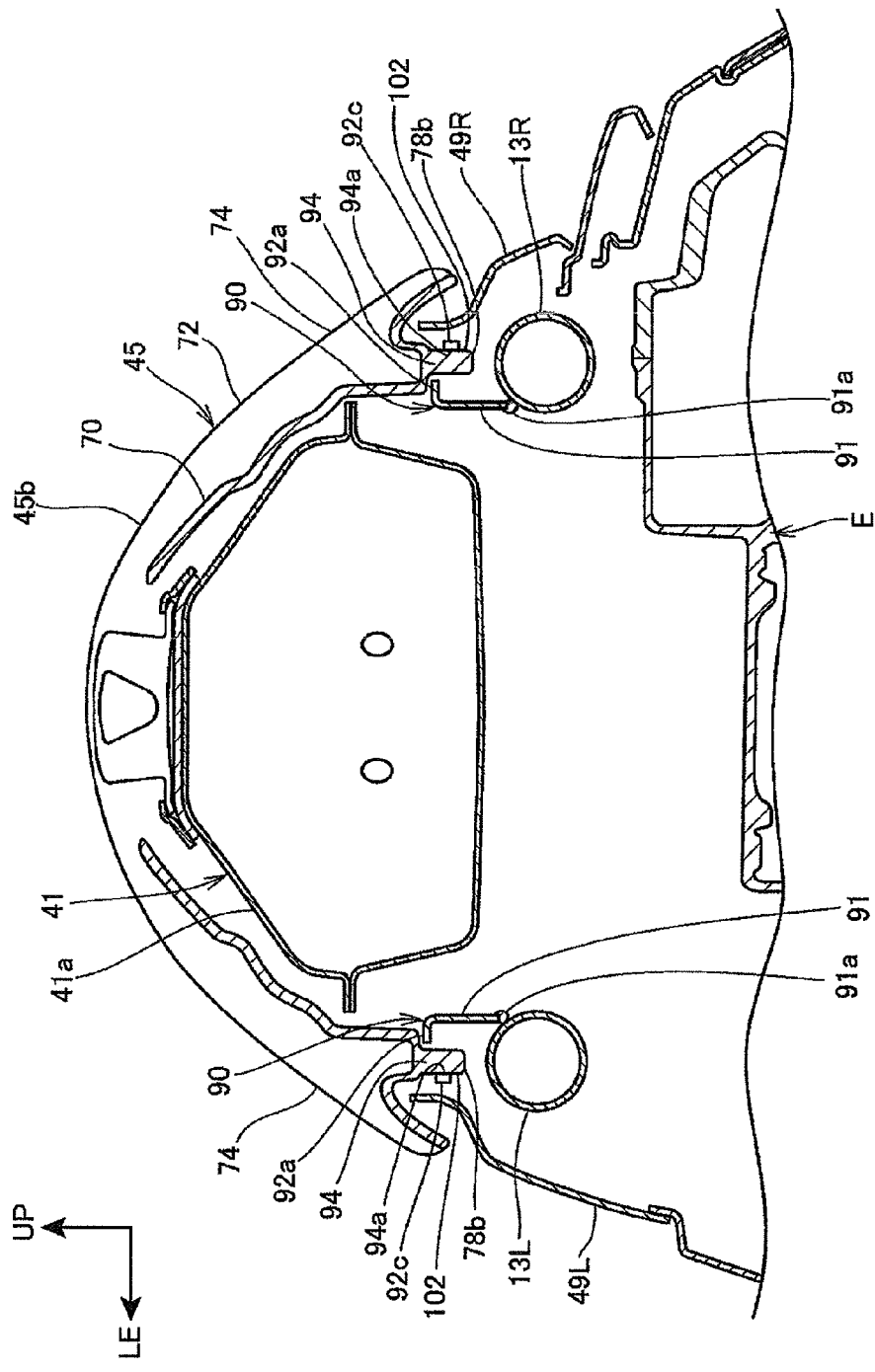
FIG. 13 is a sectional view taken along line XIII-XIII of FIG. 4.

FIG. 12 is an enlarged view of a peripheral portion of the connection plate 90 in FIG. 9. FIG. 13 is a sectional view taken along line XIII-XIII of FIG. 4.

As depicted in FIGS. 12 and 13, in a state in which the main seat 45 is attached, the positioning protrusions 78b of a substantially square shape as viewed in plan are abutted at outer side faces 102 on the outer sides in the vehicle widthwise direction thereof with the outer side edges 94a of the positioning openings 94. Consequently, the seat front portion 45b is positioned in the vehicle widthwise direction and is restricted against movement in the vehicle widthwise direction. Therefore, even in a configuration wherein the distance from the catching mechanism portion 83 to the arm portions 74 is great, such a situation that peripheral portions of the arm portions 74 become open with respect to the center side covers 49L and 49R can be suppressed efficiently.

Further, since opening of the main seat 45 can be suppressed by the positioning protrusions 78b, the catching mechanism portion 83 can be disposed further rearwardly. Consequently, such a situation wherein the catching mechanism portion 83 makes an obstacle to the disposition of some other part such as the fuel tank 41 can be prevented. Therefore, the degree of freedom in disposition of the parts can be improved.

Further, since the stay portions 99 of the center side covers 49L and 49R are fixed to the connection plates 90 in each of which the positioning opening 94 is provided, the center side covers 49L and 49R can be positioned with high accuracy with respect to the main seat 45, and such a situation that the main seat 45 and the center side covers 49L and 49R are spaced away from each other can be suppressed. Furthermore, there is no necessity to provide a separate member for fixing the center side covers 49L and 49R, and therefore, the number of parts can be reduced.

Further, as viewed in a plan view, the positioning protrusions 78b are formed in a substantially square shape shorter in the forward and rearward direction and the leftward and rightward direction than the positioning openings 94 of a substantially rectangular shape. Consequently, the positioning protrusions 78b do not abut at side faces other than the outer side faces 102 thereof with the positioning openings 94, but a relief is formed between the other side faces just mentioned and the peripheral edge portions of the positioning openings 94. Therefore, even if the dimensional accuracy of the positioning openings 94 and the positioning protrusions 78b is not managed strictly, the positioning protrusions 78b can be fitted appropriately into the positioning openings 94.

Further, since the two front and rear corner portions on the outer side of the peripheral edge portion of each positioning opening 94 are formed as corner portions of a substantially right angle and the outer side edges 94a of an elongated linear shape and the outer side faces 102 of the positioning protrusions 78b contact in surface contact with each other, the load acting upon the contacting portions can be distributed.

As depicted in FIGS. 4 and 9, the rear seat 46 is formed smaller in the vehicle widthwise direction than the main seat 45 and extends rearwardly contiguously to an upper end of the seat rear portion 45c. In particular, the rear seat 46 is provided in such a state that a lower portion of a front end 46a thereof is fitted in the rear end side recessed portion 45d of the seat rear portion 45c, and the front end 46a overlaps from above with the rear end side recessed portion 45d as viewed in plan. Therefore, the forward and rearward length of the seat 10 including the main seat 45 and the rear seat 46 can be reduced and the seat height of the rear seat 46 can be reduced.

The rear seat 46 is a so-called reclining type seat which is movable in the forward and rearward direction and whose tilting state can be adjusted between a seating state and an upright state. This configuration is described below.

Figure 14:
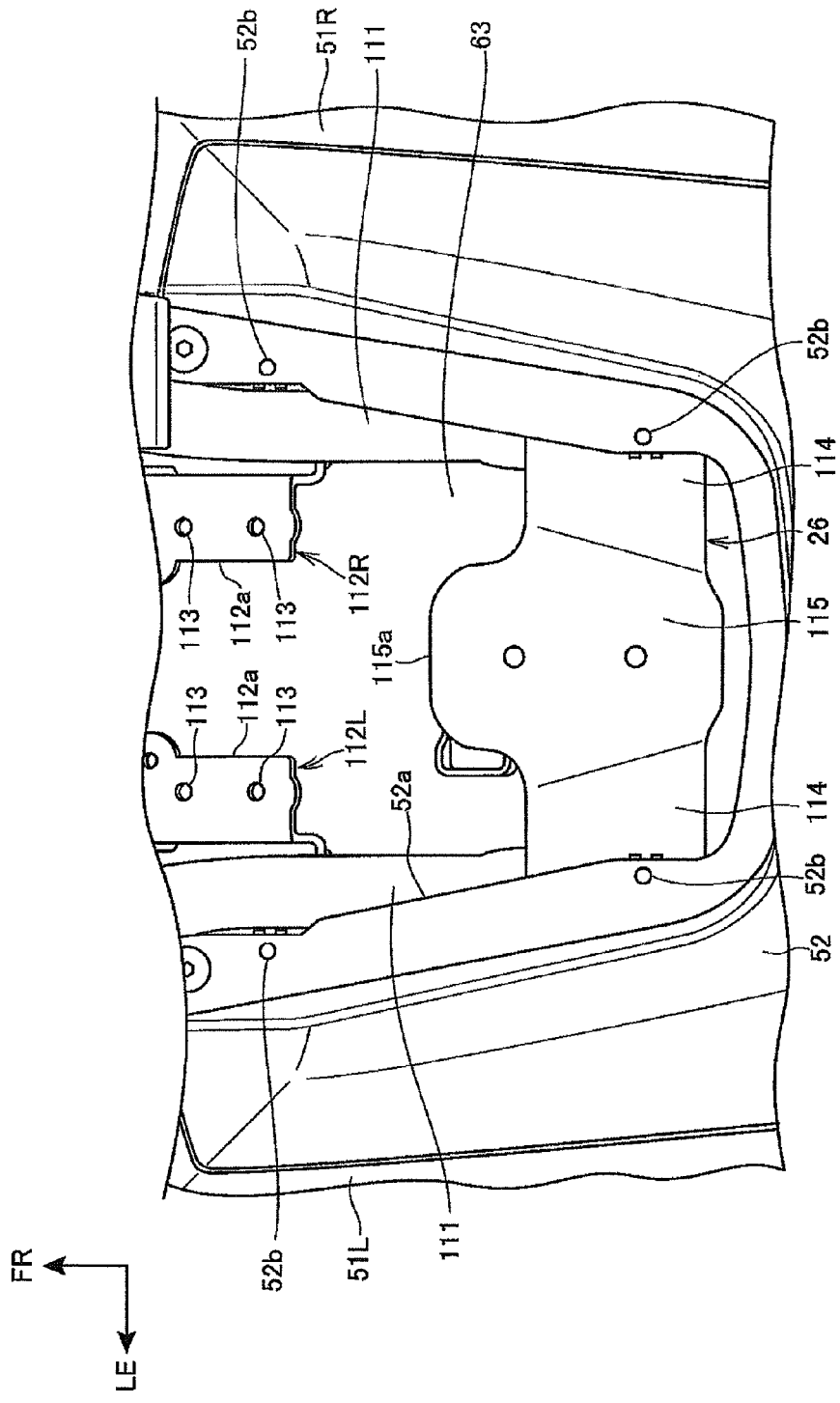
FIG. 14 is a plan view of a vehicle rear portion in a state in which a rear seat and a supporting part of the rear seat are removed.

FIG. 14 is a plan view of a rear portion of the vehicle in a state in which the rear seat 46 and a supporting part for the rear seat 46 are removed.

As depicted in FIGS. 5, 6 and 14, each of the seat frames 15L and 15R includes a rear upper extension 110 extending rearwardly upwardly from the pivot frame 14L or 14R and a rear horizontal portion 111 bent at a rear end of the rear upper extension 110 and extending substantially horizontally to a rear end.

A pair of left and right rear seat holding portions 112L and 112R are provided on inner side face portions of a front portion of the rear horizontal portions 111 and hold the rear seat 46 thereon. Each of the rear seat holding portions 112L and 112R includes a substantially flat holding plate 112a, and a pair of openings 113 (a plurality of openings juxtaposed forwardly and rearwardly) which extend through the holding plate 112a. The openings 113 are arranged in a forwardly and rearwardly juxtaposed relationship with each other at substantially the same positions in the vehicle widthwise direction. A nut portion 113a (FIG. 16) is provided on the lower face side of each opening 113.

The rear end portion cross frame 26 connects rear ends of the rear horizontal portions 111 to each other. The rear end portion cross frame 26 has base portions 114 connected to the rear horizontal portions 111 and a rear receiving portion 115 swollen upwardly by one step from the base portions 114 at the center in the vehicle widthwise direction. The rear receiving portion 115 has a tongue-shaped forward projection 115a projecting forwardly farther than the base portions 114. Upper faces of the rear receiving portion 115 and the forward projection 115a continue to each other and are inclined forwardly and downwardly.

Below the rear horizontal portions 111, a rear fender 63 is provided for covering the rear wheel 3 from above.

The rear horizontal portions 111 are covered on outer sides thereof with rear portions of the rear side covers 51L and 51R. Further, the tail cover 52 is provided on an upper face of the rear portions of the rear side covers 51L and 51R. The tail cover 52 has a cutout portion 52a extending along an outer shape of the rear seat 46, and the rear horizontal portions 111, rear seat holding portions 112L and 112R and rear end portion cross frame 26 are exposed upwardly through the cutout portion 52a.

Figure 15:
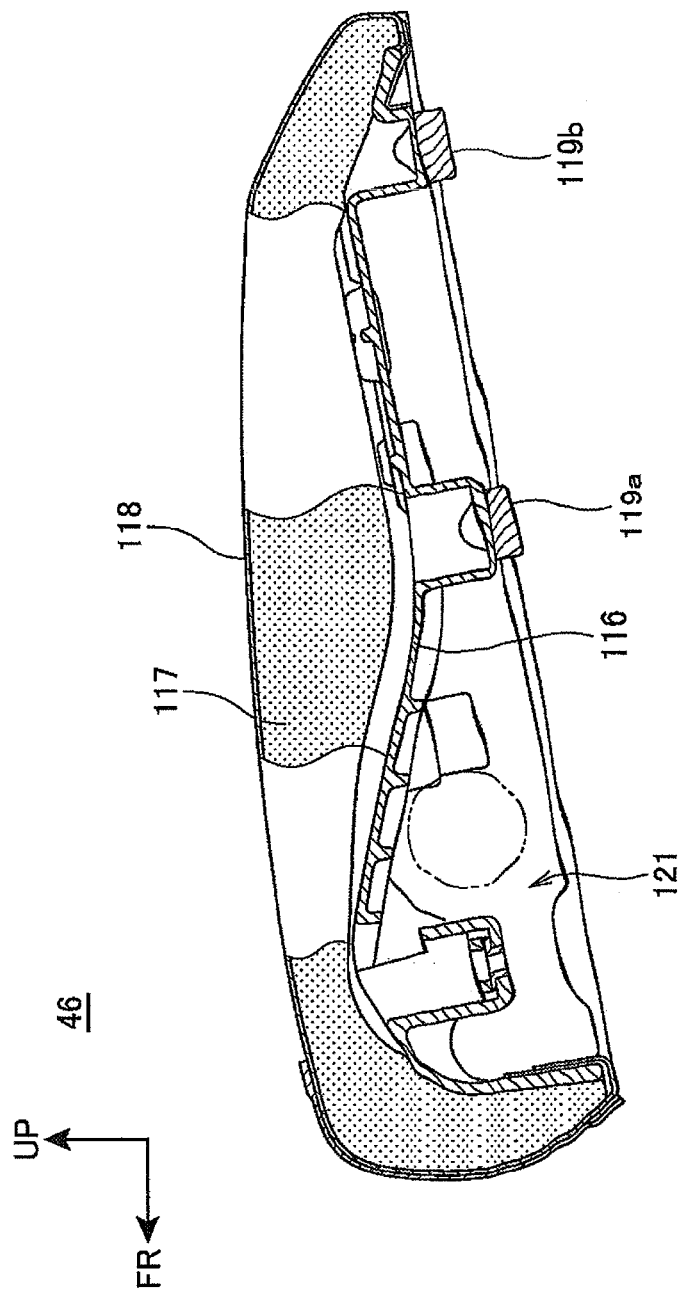
FIG. 15 is a cross sectional view of the rear seat.

FIG. 15 is a cross sectional view of the rear seat 46.

The rear seat 46 includes a rear seat bottom plate 116, a cushion 117 supported on the rear seat bottom plate 116, and a seat skin 118 which covers the cushion 117.

Seat side receiving portions 119a and 119b are provided at an intermediate portion in the forward and rearward direction and a rear end portion of the rear seat bottom plate 116 and project downwardly such that they are received by the vehicle body side. The seat side receiving portions 119a and 119b are configured from an elastic body such as, for example, rubber.

A front portion of the rear seat bottom plate 116 is swollen upwardly to form a space region 121 at a lower portion of a front portion of the rear seat 46.

Figure 16:
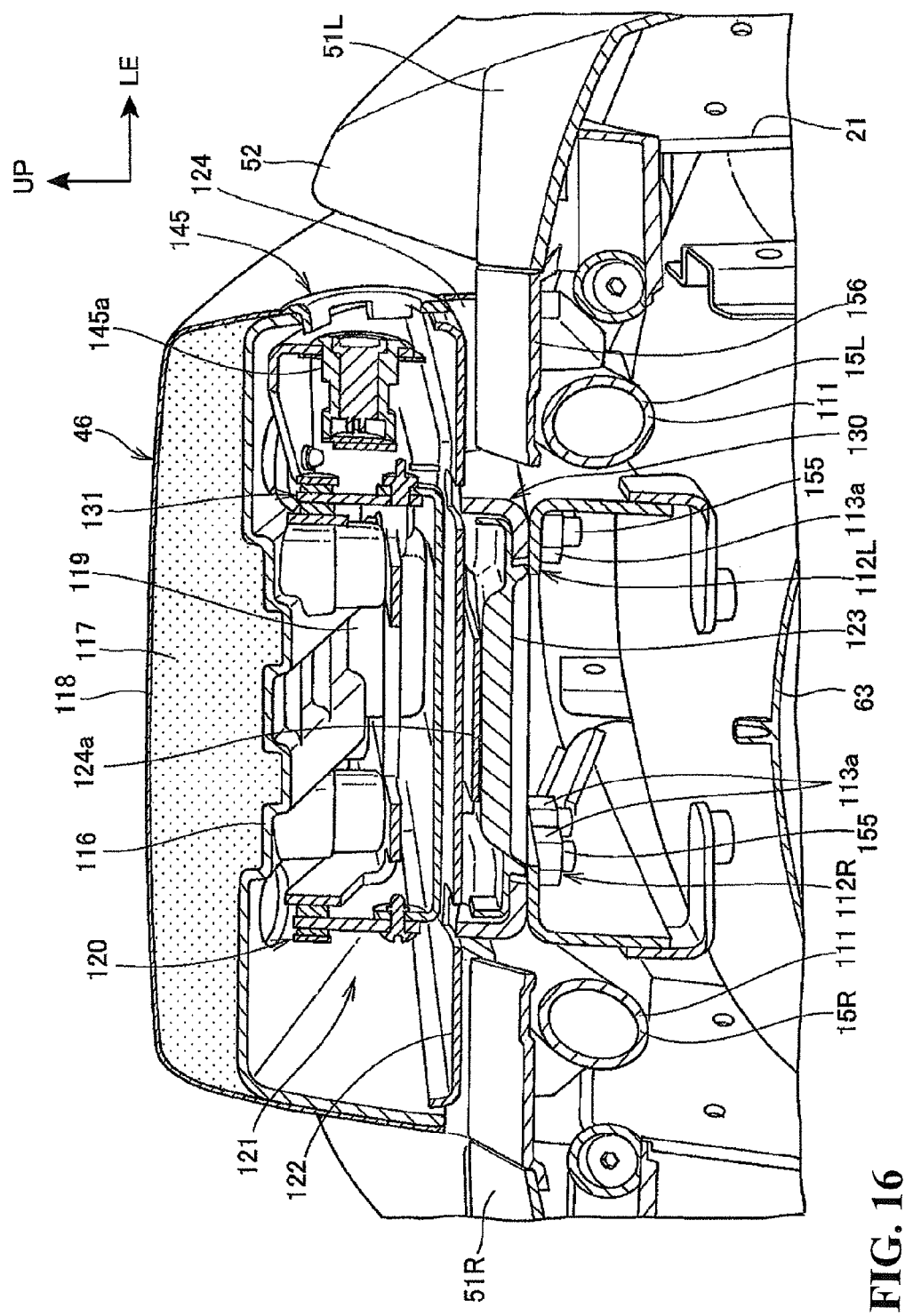
FIG. 16 is a sectional view taken along line XVI-XVI of FIG. 1.

FIG. 16 is a sectional view taken along line XVI-XVI of FIG. 1.

As depicted in FIG. 16, a seat supporting member 120 is attached to the rear seat holding portions 112L and 112R. The rear seat 46 is fixed to the seat supporting member 120 through the rear seat bottom plate 116 and an elastic member 146a hereinafter described. Further, a bottom plate cover 122 is provided on the rear seat 46 and covers the rear seat bottom plate 116 from below.

Below the rear seat 46, a decorative plate 123 and a rear cover 124 are provided. The decorative plate 123 covers part of the seat supporting member 120. The rear cover 124 covers the decorative plate 123, rear horizontal portions 111 and so forth from above.

Figure 17:
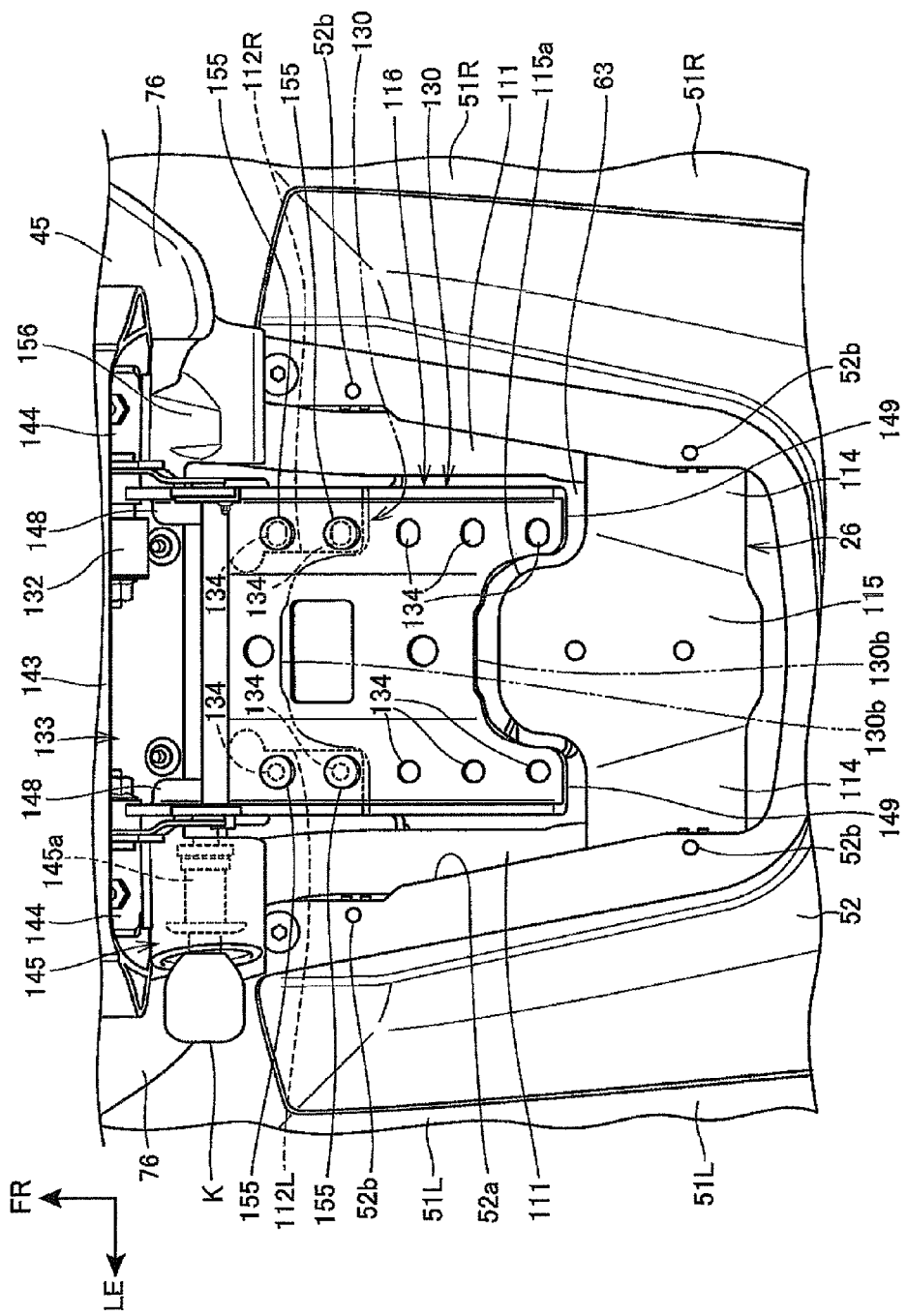
FIG. 17 is a plan view illustrating a state in which a seat supporting member is attached in the state of FIG. 14.
Figure 18:
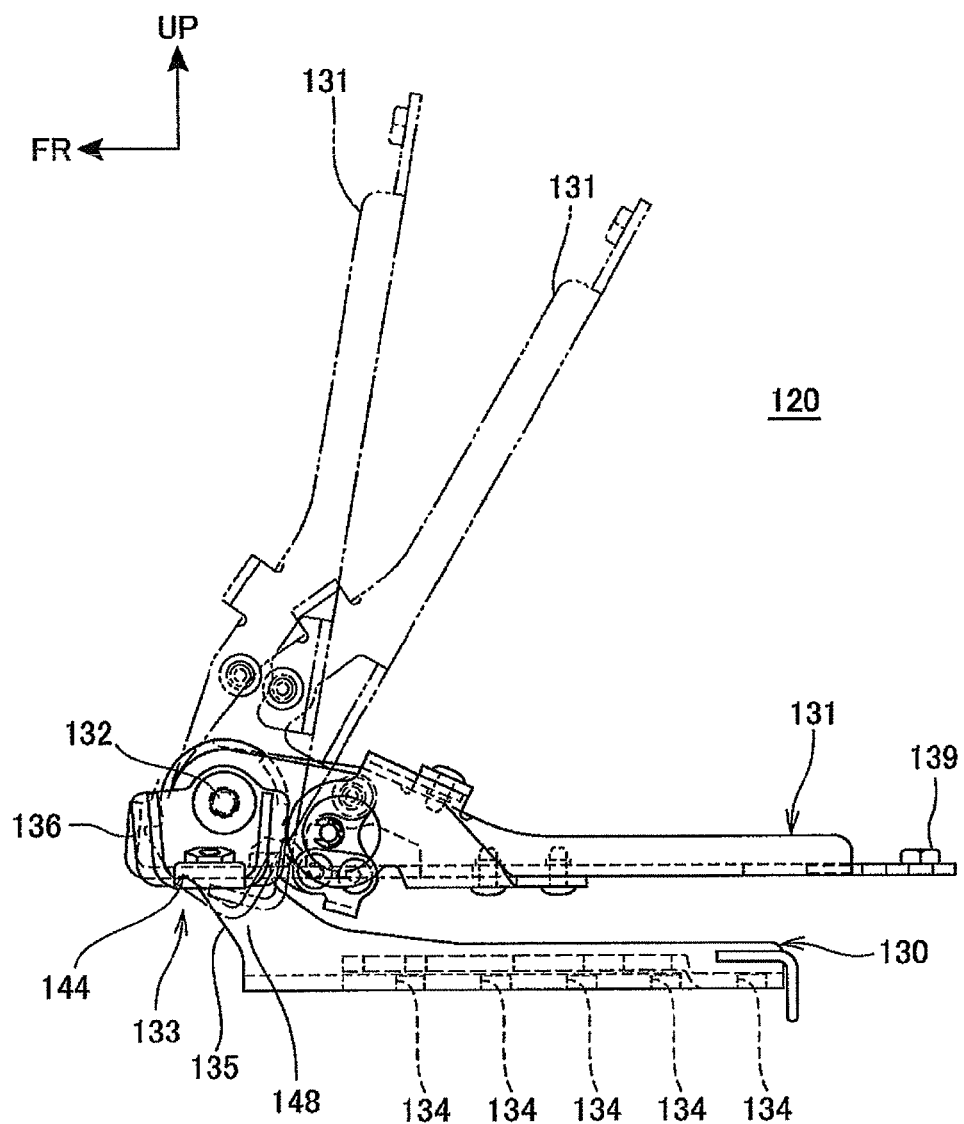
FIG. 18 is a left side elevational view of the seat supporting member.
Figure 19:
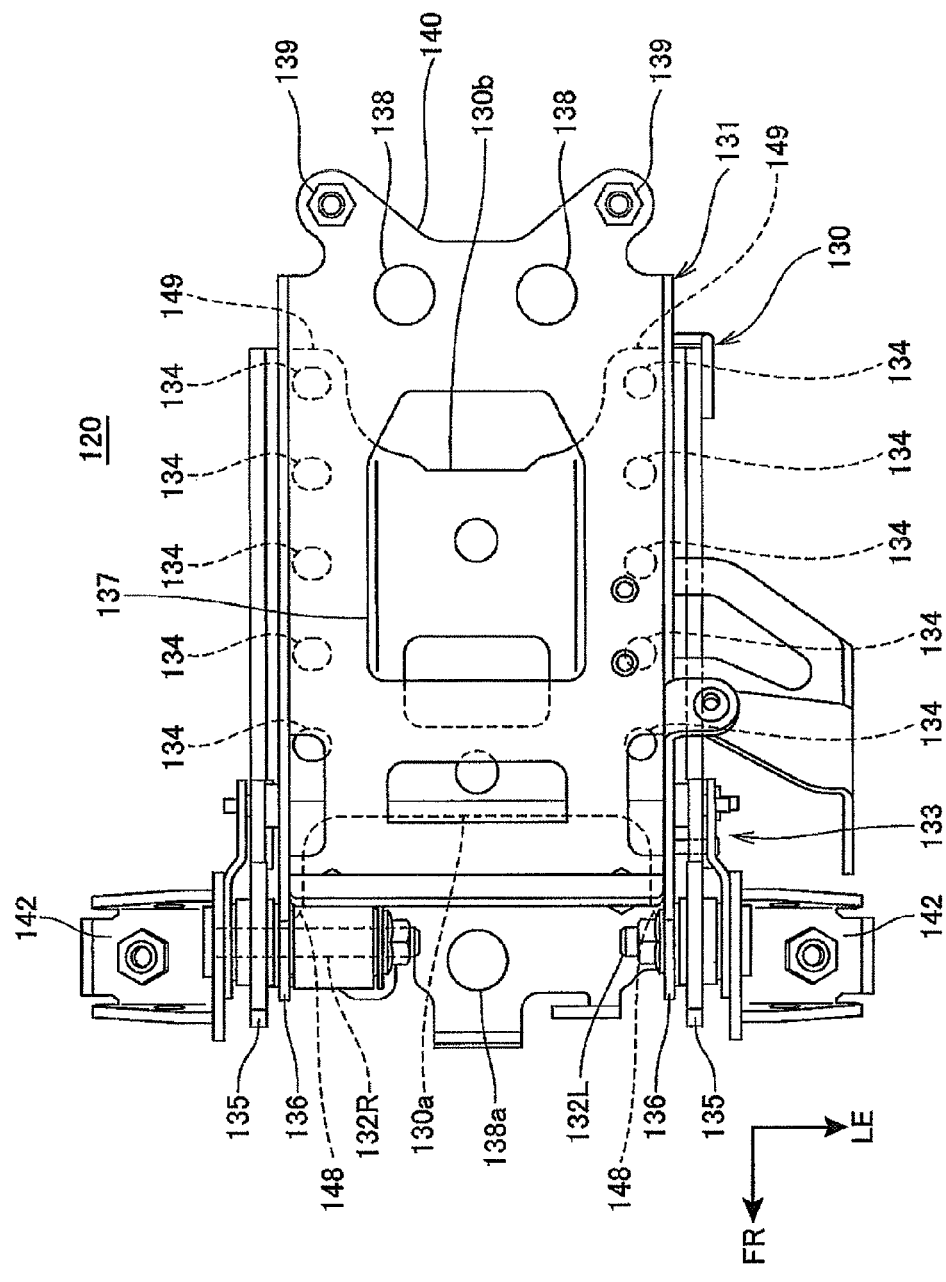
FIG. 19 is a plan view of the seat supporting member.

FIG. 17 is a plan view illustrating a state in which the seat supporting member 120 is attached in the state of FIG. 14. FIG. 18 is a left side elevational view of the seat supporting member 120. FIG. 19 is a plan view of the seat supporting member 120.

As depicted in FIGS. 17 to 19, the seat supporting member 120 includes a base plate 130 (rear seat base plate), a seat connection plate 131, and a pair of left and right shaft portions 132L and 132R. The base plate 130 is attached to the rear seat holding portions 112L and 112R. The seat connection plate 131 is connected to the rear seat 46. The shaft portions 132L and 132R connect the seat connection plate 131 for pivotal motion to the base plate 130. The seat supporting member 120 further includes a reclining mechanism unit 133 which makes it possible to fix the pivoted position of the seat connection plate 131 to an arbitrary pivoted position.

The base plate 130 is a plate member formed in a substantially H-shape as viewed in a plan view and elongated in the forward and rearward direction. The base plate 130 has a pair of front arm portions 148 and a pair of rear arm portions 149. The front arm portions 148 project forwardly from the left and right ends of a front edge portion of the base plate 130. The rear arm portions 149 project rearwardly from the left and right ends of a rear edge portion of the base plate 130. More particularly, the base plate 130 has a front side recessed portion 130a, which is depressed to the rear side, between the front arm portions 148, and has a rear side recessed portion 130b (recessed portion of the rear seat base plate), which is depressed to the front side, between the rear arm portions 149.

Shaft supporting portions 135 are provided at left and right edge portions of a front end portion of the base plate 130 and rise upwardly.

The base plate 130 includes a plurality of plate side openings 134 disposed in a juxtaposed relationship on straight lines in the forward and rearward direction in a spaced relationship from each other by an equal distance. The plate side openings 134 are arranged in two rows along left and right side edge portions of the base plate 130. The plate side openings 134 on the left side have a substantially circular shape while the plate side openings 134 on the right side are each formed in an elongated hole shape elongated in the vehicle widthwise direction. Consequently, the attachment position of the base plate 130 can be finely adjusted in the leftward and rightward direction. In the present embodiment, the plate side openings 134 are provided in two rows, in each of which five plate side openings 134 are provided along the forward and rearward direction.

The base plate 130 is fixed to the rear seat holding portions 112L and 112R by base plate fixing bolts 155 (fastening members) to be fitted in the plate side openings 134 and fastened to the openings 113. More particularly, the base plate 130 is fixed by the base plate fixing bolts 155 such that, in two arbitrary ones of the plate side openings 134 adjacent each other in the forward and rearward direction in each of the two left and right rows, the base plate fixing bolts 155 are inserted.

In other words, the base plate 130 is configured such that it can be fixed to a plurality of fixing positions different from each other in the forward and rearward direction by selecting, as the inserting positions of the base plate fixing bolts 155, two arbitrary adjacent ones of the plate side openings 134 juxtaposed in the forward and rearward direction.

The seat connection plate 131 is formed in a substantially rectangular shape elongated in the forward and rearward direction and has, at a front end thereof, shaft connection portions 136 to which the shaft portions 132L and 132R are connected. The shaft portions 132L and 132R are disposed so as to extend in the vehicle widthwise direction and connect the shaft connection portions 136 and the shaft supporting portions 135 to each other. The seat connection plate 131 can be pivoted around the shaft portions 132L and 132R. The reclining mechanism unit 133 is disposed around the shaft portions 132L and 132R. The reclining mechanism unit 133 fixes the pivotal position of the seat connection plate 131 to an arbitrary position between a substantially horizontal seating posture and a substantially vertical upright posture.

Figure 26:
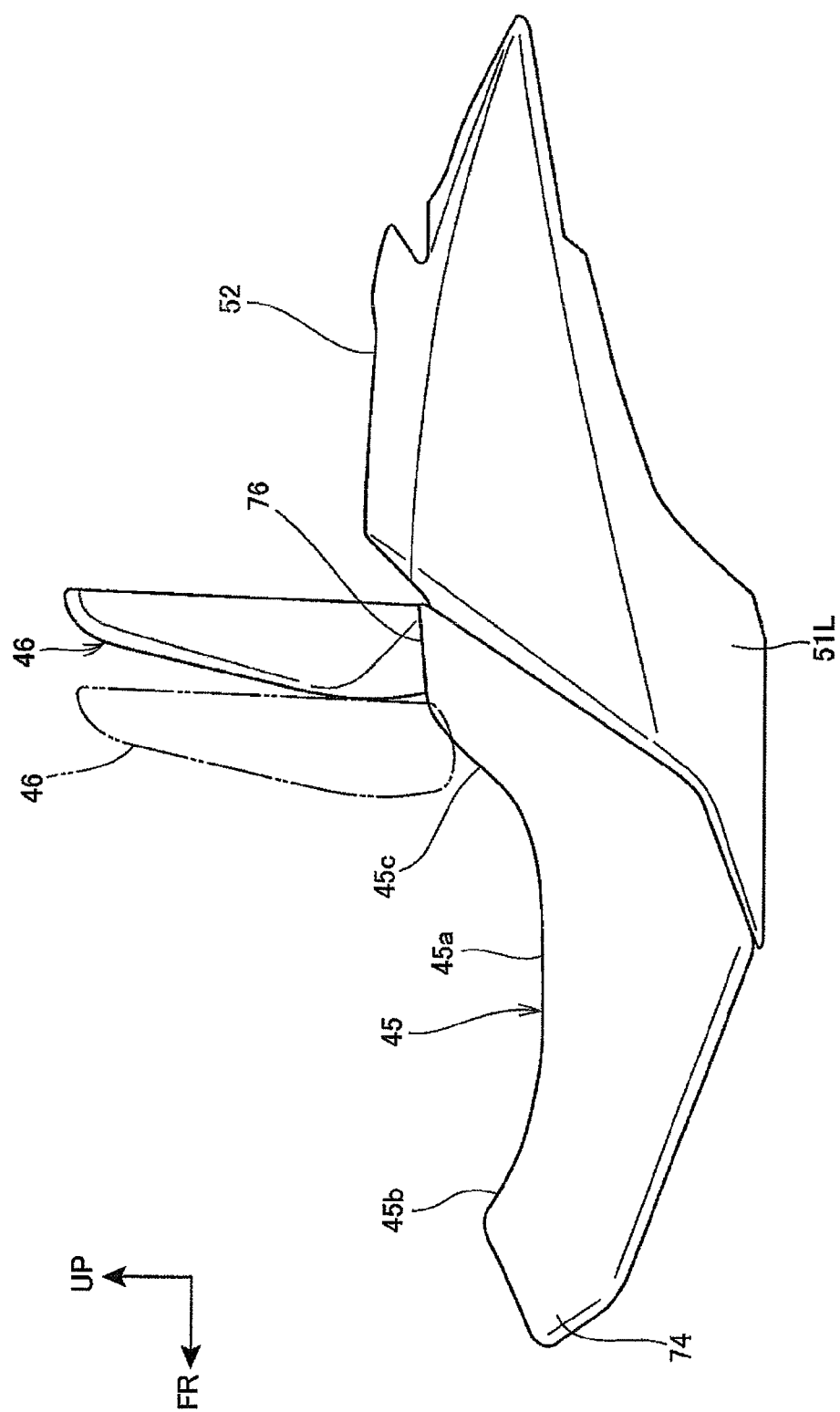
FIG. 26 is a left side elevational view illustrating a state in which the rear seat is in an upright posture at a rearmost end position.

In particular, the rear seat 46 supported on the seat connection plate 131 pivots forwardly or downwardly by pivotal motion of the seat connection plate 131 to vary its posture between the seating posture and the upright posture (FIG. 26).

Figure 20:
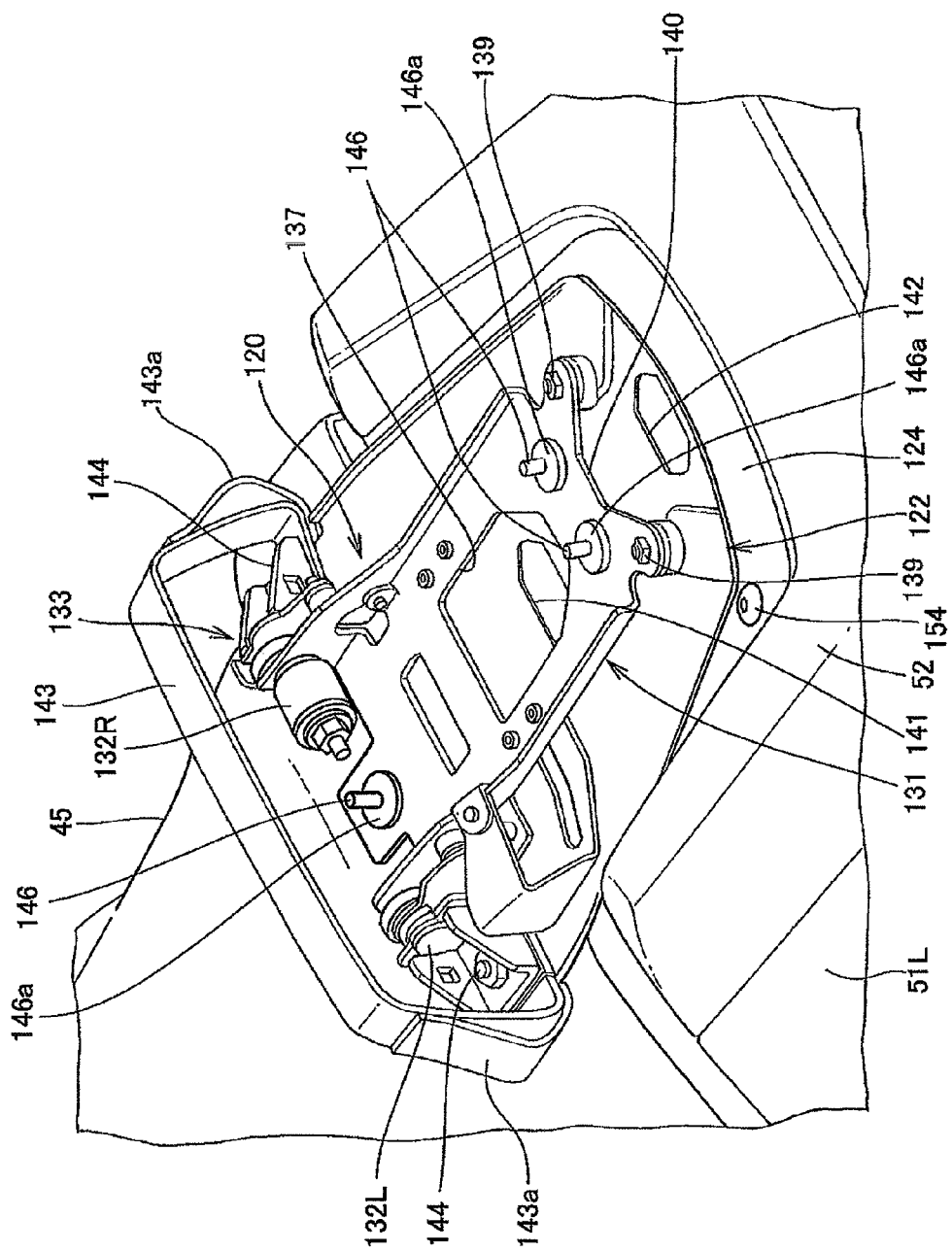
FIG. 20 is a perspective view illustrating a state in which the rear seat is removed from a seat connection plate at a seating posture.

FIG. 20 is a perspective view illustrating a state in which the rear seat 46 is removed from the seat connection plate 131 in the seating posture described above.

As depicted in FIGS. 19 and 20, an opening 137 is formed at an intermediate portion of the seat connection plate 131 in the forward and rearward direction such that the opening 137 extends through the seat connection plate 131. The seat connection plate 131 has a pair of holes 138 provided behind the opening 137 thereof and has a hole 138a provided at a front end portion thereof. Bolts 146 are fitted in the holes 138 and 138a and connect the seat connection plate 131 and the rear seat bottom plate 116 to each other. A tubular elastic member 146a is provided on an outer periphery of the bolts 146, and the rear seat bottom plate 116 is rubber-mounted on the seat connection plate 131 through the elastic member 146a. More particularly, the elastic member 146a includes a mount collar (not depicted) fitted on an outer periphery of each bolt 146, a tubular mount rubber member (not depicted) which fits on an outer periphery of the mount collar, and a washer (not depicted) provided on an end face of the mount rubber member in its axial direction. Since the rear seat 46 is rubber-mounted on the seat connection plate 131 in this manner, the cushion performance of the rear seat 46 is improved and provides a good riding comfort.

Further, the seat connection plate 131 has fixing portions 139 provided at rear end portions thereof, and the bottom plate cover 122 is fastened to the fixing portions 139. Further, the seat connection plate 131 has an escape portion 140, which is cut out to the front side, provided between the fixing portions 139 thereof.

The bottom plate cover 122 is provided such that it covers the seat connection plate 131 from below with the seat connection plate 131 sandwiched between the rear seat bottom plate 116 and the bottom plate cover 122, and hides the seat connection plate 131 from the outer sides. The bottom plate cover 122 includes a receiving portion opening 141 at a position thereof at which the receiving portion opening 141 overlaps with the opening 137 of the seat connection plate 131. Further, the bottom plate cover 122 includes another receiving portion opening 142 provided at a position of the seat connection plate 131 behind the escape portion 140.

Figure 21:
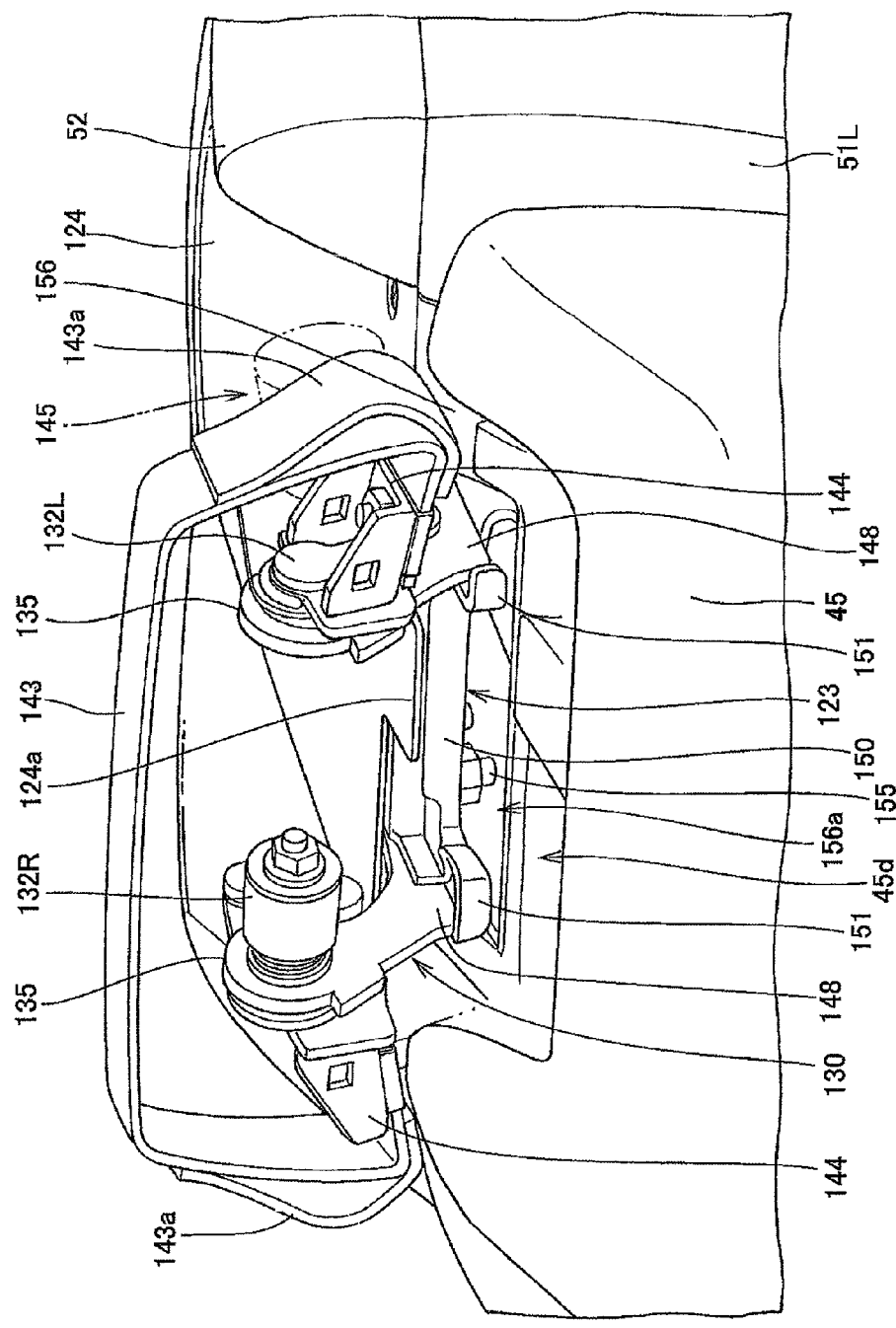
FIG. 21 is a perspective view depicting the seat supporting member as viewed from the front side.

FIG. 21 is a perspective view of the seat supporting member 120 as viewed from the front side. In FIG. 21, the seat connection plate 131, rear seat 46 and so forth are not depicted.

As depicted in FIGS. 19 to 21, plate-shaped seat belt fixing portions 144 (seat belt fastening portions) are connected to the opposite left and right end portions of the shaft portions 132L and 132R and project to the outer sides in the vehicle widthwise direction. A seat belt 143 is provided in the vehicle widthwise direction across the upper face side of the front end 46a of the rear seat 46 and is disposed such that the opposite end portions thereof go round a lower face of the seat belt fixing portions 144 and are fastened and fixed to the seat belt fixing portions 144. The passenger who is seated on the rear seat 46 can grasp the seat belt 143.

The seat belt 143 has load hanging hook portions 143a (load hanging hooks) at positions on the outer sides of the shaft portions 132L and 132R in the vehicle widthwise direction and substantially on extension lines of the shaft portions 132L and 132R. The load hanging hook portions 143a are provided at positions sidewardly of the left and right side faces of the rear seat 46. The load hanging hook portions 143a are formed annularly on the outer side faces of the opposite end portions of the seat belt 143 by sewing a belt member similar to the seat belt 143 at two upper and lower places.

As depicted in FIGS. 16 and 17, an operation portion 145 is provided on a left side face of a front portion of the rear seat 46 such that it is operated by a user to carry out a pivoting movement of the rear seat 46. The operation portion 145 has a key cylinder 145a connected to the reclining mechanism unit 133. The key cylinder 145a and the reclining mechanism unit 133 are provided in the space region 121 below the rear seat bottom plate 116.

The user can insert a main key K of the motorcycle 1 into the key cylinder 145a from the outside and turn the key cylinder 145a to operate the reclining mechanism unit 133 to adjust the pivoting position of the rear seat 46. The main key K is a key for switching a main power supply of the motorcycle 1 between on and off and is inserted, during operation of the motorcycle 1, in a main switch portion, for example, in the proximity of the head pipe 12. In a state in which the main key K is removed from the main switch portion, the engine E stops. In other words, when the reclining mechanism unit 133 is operated by the main key K, the engine E is in a stopping state without fail.

More particularly, the reclining mechanism unit 133 is configured including, for example, a ratchet mechanism so that the following operations can be carried out.

If the key cylinder 145*a* is operated in a state in which the rear seat 46 is in the seating posture, then the fixation of the pivoting position is canceled, and the rear seat 46 is permitted to pivot to the upright posture side.

If the key cylinder 145*a* is operated in a state in which the rear seat 46 is in the upright posture, then the fixation of the pivoting position is canceled, and the rear seat 46 is permitted to pivot to the seating posture side.

In an intermediate state in which the pivoting position of the rear seat 46 is positioned between the seating posture and the upright posture, the rear seat 46 can be pivoted to the upright posture side without any operation of the key cylinder 145*a*.

Further, in the intermediate state in which the pivoting position of the rear seat 46 is positioned between the seating posture and the upright posture, if the key cylinder 145*a* is operated, then the rear seat 46 can be pivoted to the seating posture side.

Consequently, if the user does not intentionally operate the key cylinder 145*a*, then the states of the seating posture and the upright posture do not change, and therefore, such a situation that the states of the seating posture and the upright posture are changed inadvertently can be prevented. Further, in the intermediate state described above, when the key cylinder 145*a* is not operated, although the rear seat 46 can be pivoted to the upright posture side, the rear seat 46 cannot be pivoted to the seating posture side. Therefore, while the angle of the rear seat 46 as a back rest can be adjusted readily, such a situation that the rear seat 46 falls to the seating posture side inadvertently can be prevented.

Figure 22:
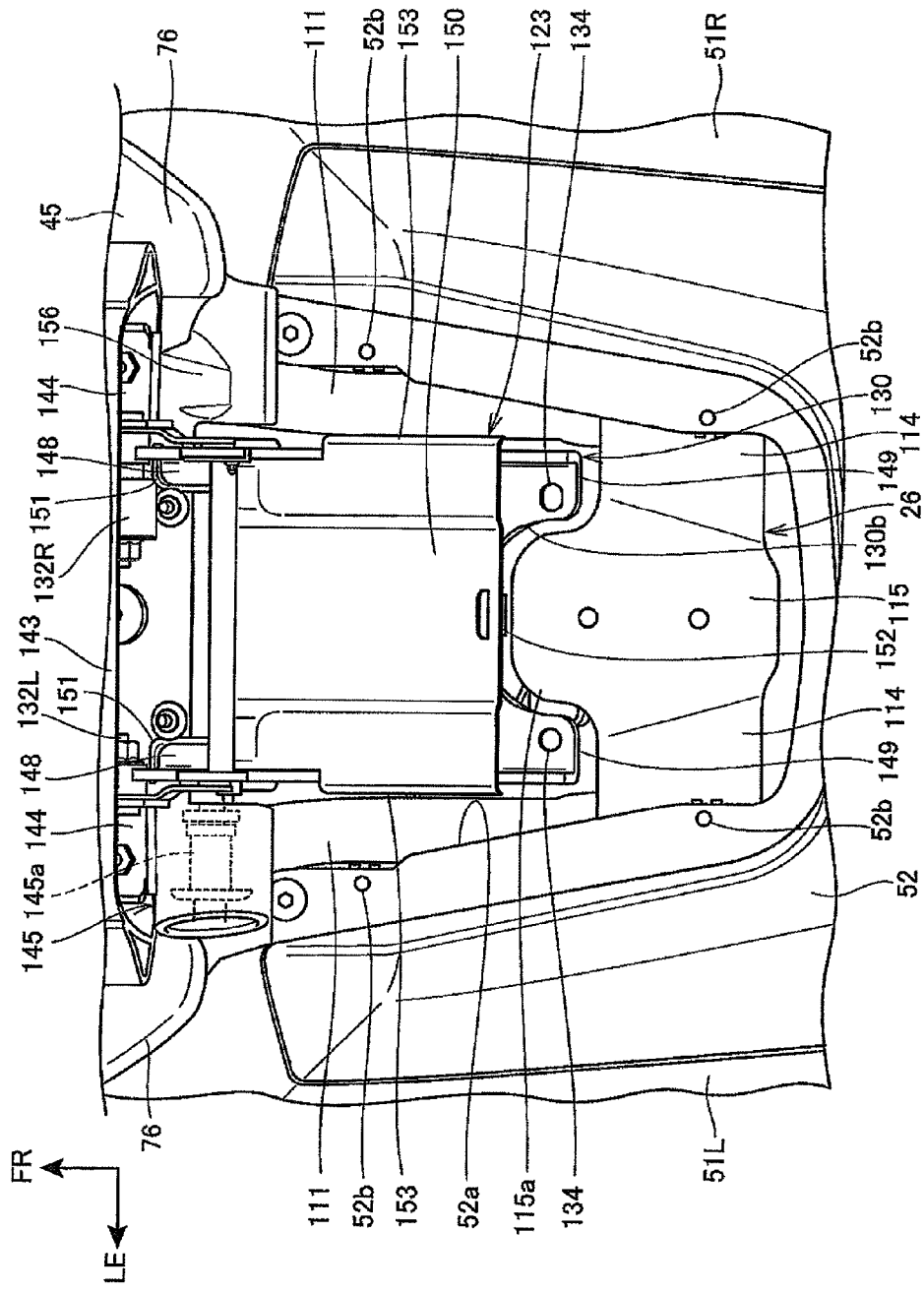
FIG. 22 is a plan view illustrating a state in which a decorative plate is attached in the state of FIG. 17.
Figure 23:
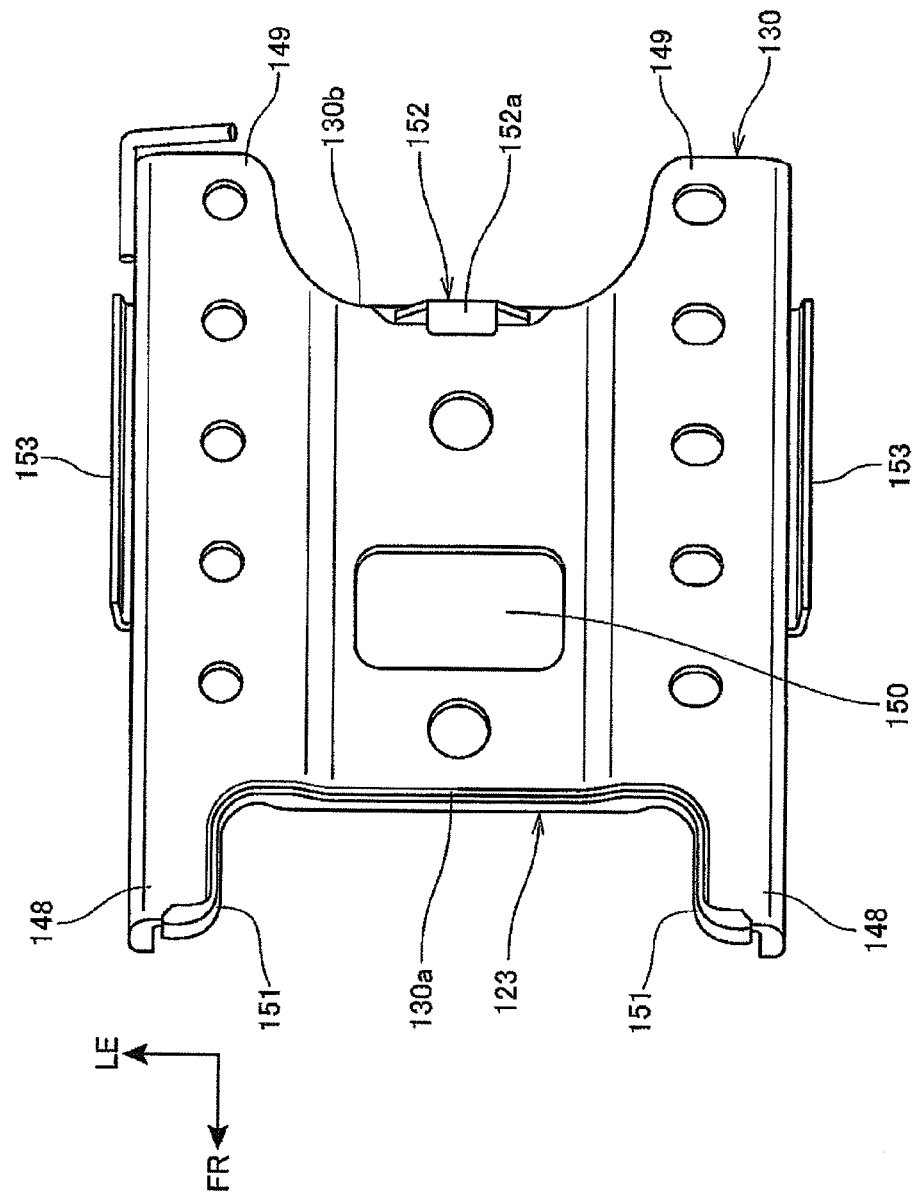
FIG. 23 is a view depicting a base plate as viewed from the lower side in the state in which the decorative plate is attached.

FIG. 22 is a plan view illustrating a state in which the decorative plate 123 is attached in the state of FIG. 17. FIG. 23 is a view of the base plate 130 as viewed from the lower face side in a state in which the decorative plate 123 is attached.

As depicted in FIGS. 21 to 23, the decorative plate 123 is formed in such a shape that it covers most parts of the base plate 130 except the front arm portions 148 and the rear arm portions 149 from above. The decorative plate 123 is, for example, a molded part made of resin.

The decorative plate 123 includes a decorative plate main body 150 of a substantially rectangular shape, a pair of front locking portions 151, a rear locking portion 152 (rear recessed portion), and side plate portions 153. The front locking portions 151 project forwardly from the left and right ends of a front edge of the decorative plate main body 150. The rear locking portion 152 is provided at an intermediate portion of a rear end of the decorative plate main body 150 in the vehicle widthwise direction. The side plate portions 153 extend downwardly from left and right side edges of the decorative plate main body 150.

The front locking portions 151 are formed in a shape of a pawl which first extends forwardly and then is bent to the outer side in the vehicle widthwise direction.

The rear locking portion 152 has a pawl portion 152*a* which first extends downwardly from a rear edge of the decorative plate main body 150 and then extends forwardly. The rear locking portion 152 and the decorative plate main body 150 in the proximity of a base portion of the pawl portion 152*a* form a recessed shape of a substantially U-shape as viewed in a side elevation.

The decorative plate 123 is attached to the base plate 130 such that the front locking portions 151 are caught by an inner edge and a front end of the front arm portions 148 of the base plate 130 and the rear locking portion 152 is fitted into the rear side recessed portion 130*b* of the base plate 130 from rearwardly. The side plate portions 153 cover part of the side faces of the base plate 130.

Figure 24:
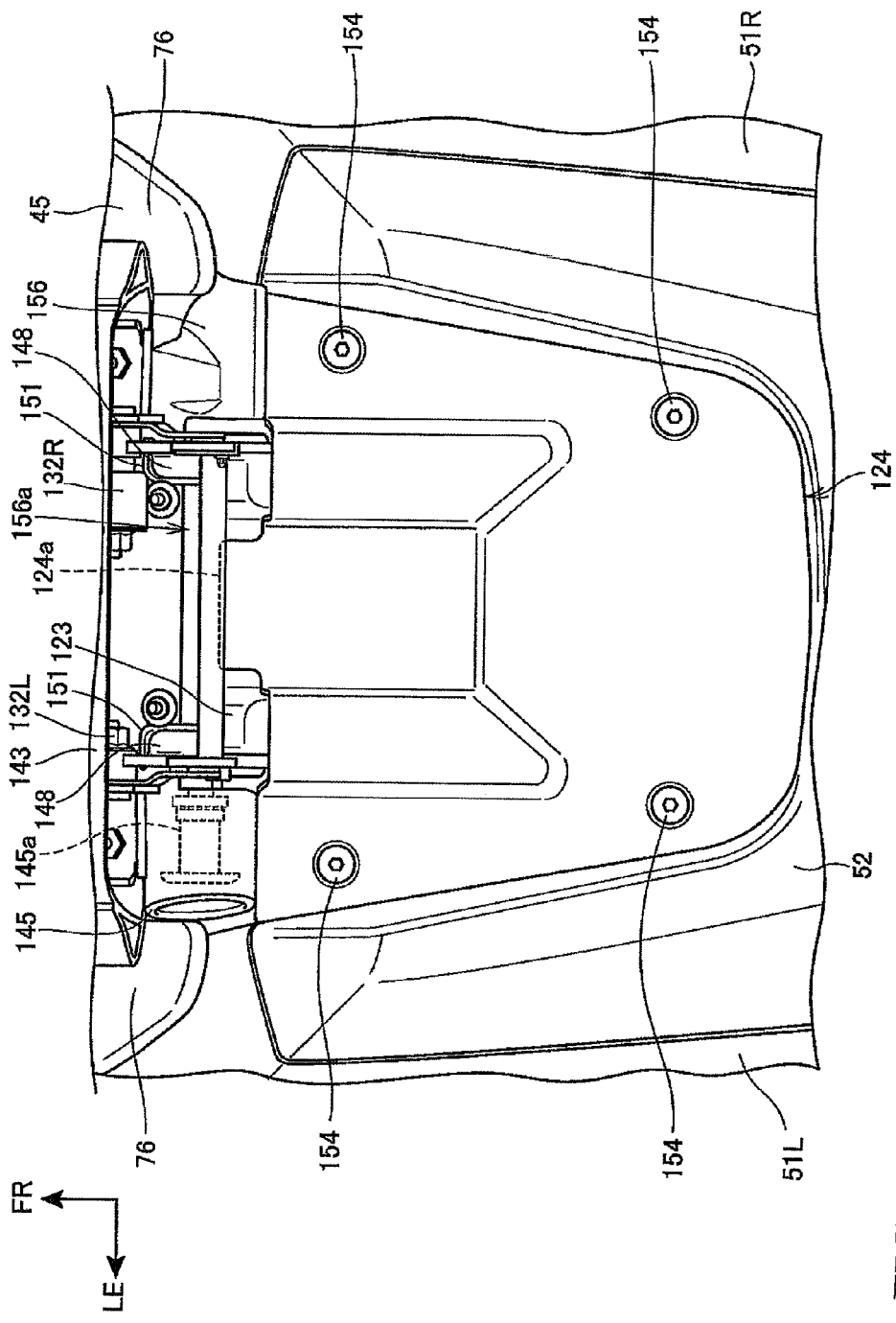
FIG. 24 is a plan view illustrating a state in which a rear cover is attached in the state of FIG. 22.

FIG. 24 is a plan view depicting a state in which the rear cover 124 is attached in the state of FIG. 22.

As depicted in FIGS. 21, 22 and 24, the rear cover 124 is a plate-like cover of a substantially rectangular shape provided so as to close up the cutout portion 52*a* of the tail cover 52 from above. The rear cover 124 has a cover side forward projection 124*a* extending forwardly like a tongue from the center of a front edge thereof in the vehicle widthwise direction.

The rear cover 124 covers the rear horizontal portions 111, base plate 130, decorative plate 123 and rear end portion cross frame 26 from above. The rear cover 124 is fixed to fixing portions 52*b* disposed on a peripheral edge portion of the cutout portion 52*a* of the tail cover 52 by rear cover fixing members 154 fitted at a peripheral edge portion thereof.

An intermediate cover 156 is provided in front of the rear cover 124 and covers a gap between a front edge of the rear cover 124 and the rear end edge 75 of the main seat 45. The intermediate cover 156 is provided in a forwardly and downwardly inclined relationship from a front edge of the rear cover 124 to the rear end edge 75 side of the main seat 45. The intermediate cover 156 has a cover opening 156*a* provided at an intermediate portion thereof in the vehicle widthwise direction and open forwardly and upwardly.

A front portion of the base plate 130 is exposed to the outer side in front of the rear cover 124 through the cover opening 156*a*. The seat connection plate 131, connected to the shaft portions 132L and 132R at a front portion of the base plate 130, is disposed entirely on the outer side of the rear cover 124.

The seat connection plate 131 is disposed, in a state of the seating posture indicated by a solid line in FIG. 18, substantially in parallel to and above the rear cover 124. More particularly, in the state of the seating posture, the rear cover 124 is in a state in which it is sandwiched between the seat connection plate 131 and the base plate 130, and the rear seat 46 is supported on the upper face of the seat connection plate 131.

Figure 25:
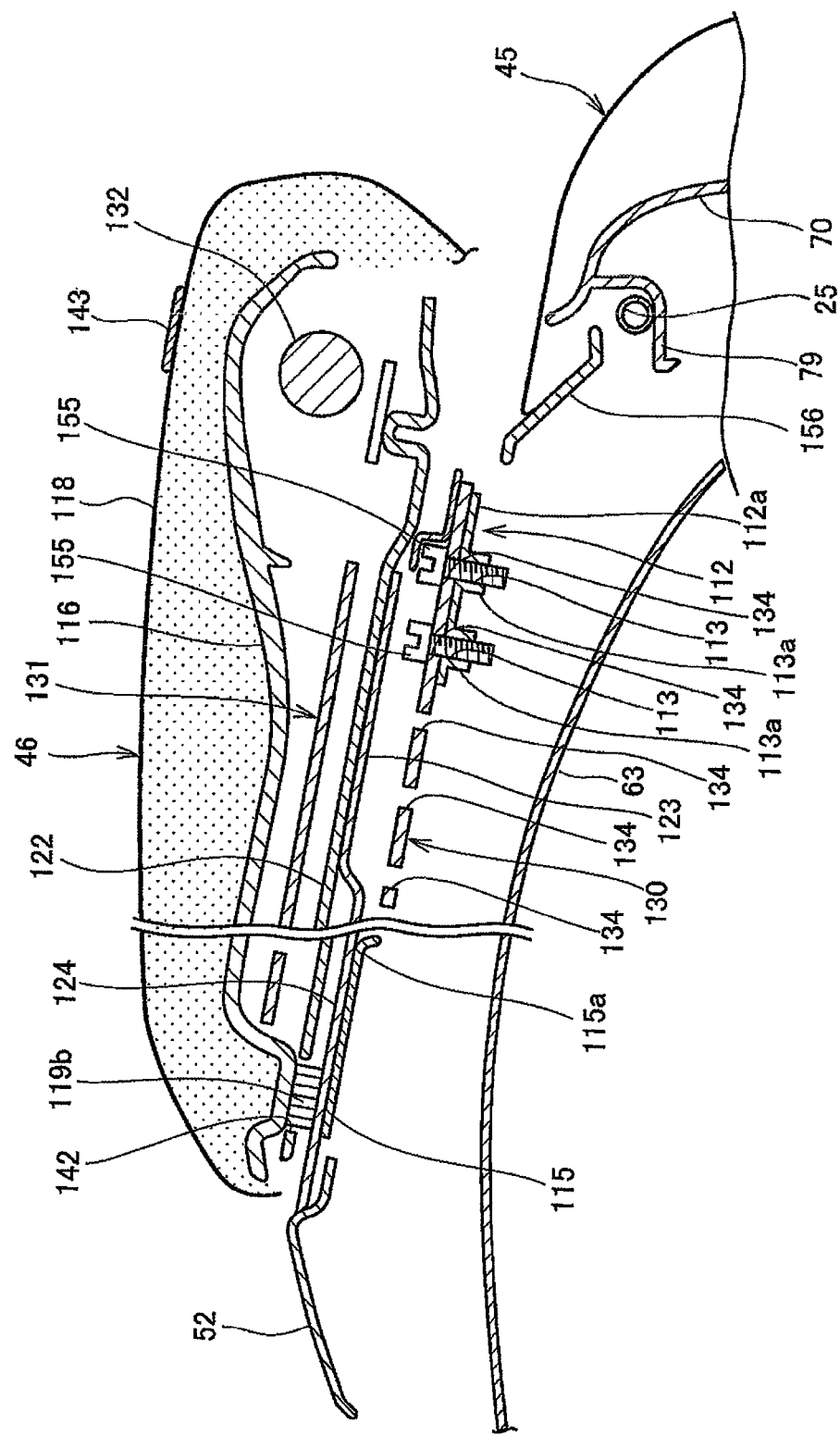
FIG. 25 is a sectional view taken along line XXV-XXV of FIG. 4.

FIG. 25 is a sectional view taken along line XXV-XXV of FIG. 4.

As depicted in FIG. 25, in the state of the rear seat 46 in the seating posture, the seat side receiving portion 119*b* provided at a rear end of the rear seat bottom plate 116 extends through the receiving portion opening 142 of the bottom plate cover 122 and abuts with the rear cover 124. Consequently, the load when the passenger is seated or in a like case is received by the rear receiving portion 115 of the rear end portion cross frame 26 through the seat side receiving portion 119*b* and the bottom plate cover 122. Also when the rear seat 46 is moved forwardly, the load of the rear seat 46 is received by the forward projection 115*a* extending forwardly from the rear receiving portion 115. Also the seat side receiving portion 119*a* (FIG. 15) extends through the opening 137 and the receiving portion opening 141 depicted in FIG. 20 and abuts with the rear cover 124.

A procedure for moving the rear seat 46 in the forward or rearward direction is hereinafter described.

First, the user would operate the operation portion 145 with the main key K to move the rear seat 46 into a state of an upright posture to expose the rear cover 124 to the outside as depicted in FIG. 24. Then, the user would remove the rear cover 124 to expose the decorative plate 123 to the outside as depicted in FIG. 22, cancel the locking of the decorative plate 123, and remove the decorative plate 123 to expose the base plate 130 to the outside as depicted in FIG. 17.

In the state illustrated in FIG. 17, the base plate 130 is fixed to the rear seat holding portions 112L and 112R by the base plate fixing bolts 155 through the two (totaling four on the left and right) front plate side openings 134. Thus, the rear seat 46 is disposed at a rearmost end position.

In the state in which the rear seat 46 is positioned at the rearmost end, the forward projection 115a of the rear end portion cross frame 26 is positioned in the rear side recessed portion 130b of the base plate 130. Since the base plate 130 is formed in a substantially H-shape and the forward projection 115a extends into the rear side recessed portion 130b in this manner, the strength and the rigidity of the rear receiving portion 115 can be assured. Consequently, the thickness of the rear receiving portion 115 can be reduced thereby to achieve a reduction in the weight. Further, since the forward projection 115a is provided, even in the state in which the rear seat 46 is moved forwardly, the load of the rear seat 46 can be received by the forward projection 115a.

When the rear seat 46 is to be moved forwardly, the user would remove the base plate fixing bolts 155 and then fix the base plate 130 to the rear seat holding portions 112L and 112R by the base plate fixing bolts 155 through the plate side openings 134 on the rear portion side of the base plate 130. Consequently, the rear seat 46 is fixed in a state in which it is moved forwardly from the position of the rearmost end described hereinabove. The base plate 130 moves forwardly or rearwardly through the cover opening 156a and between the rear projections 76 of the main seat 45.

If the base plate 130 is fixed by the two (totaling four on the left and right) rear plate side openings 134 of the base plate 130 as indicated by a two-dot chain line in FIG. 17, then the rear seat 46 is positioned at the frontmost position. In particular, by fixing the base plate 130 using arbitrary ones of the plate side openings 134 between the front end and the rear end of the base plate 130, the rear seat 46 can be fixed at an arbitrary one of a plurality of positions in the forward and rearward direction. The user would attach, after the position of the rear seat 46 is adjusted, the decorative plate 123 and the rear cover 124.

In the state in which the rear seat 46 is moved to the frontmost end, the rear side recessed portion 130b of the base plate 130 is covered with the cover side forward projection 124a from above and the rear side recessed portion 130b is hidden by the cover side forward projection 124a and is not visually observed from above. Therefore, even where the rear side recessed portion 130b is formed in order to provide the forward projection 115a, the appearance can be improved.

FIG. 26 is a left side elevational view illustrating a state in which the rear seat 46 is in the upright posture at the rearmost end position. In FIG. 26, the rear seat 46 in a state in which it is in the upright posture at the frontmost end position is indicated by a two-dot chain line.

As depicted in FIG. 26, in the present embodiment, since the rear seat 46 can be erected uprightly and the rear seat 46 can be fixed at a desired one of fixing positions which are different from each other in the forward and rearward direction. Therefore, when the rider uses the rear seat 46 as a back rest, the back rest can be positioned at a desired position and a good riding comfort can be obtained. Further, by operating the operation portion 145, the inclination angle of the rear seat 46 can be adjusted, and the riding comfort can be further improved.

In the state in which the rear seat 46 is in the upright posture, the seat connection plate 131 is covered with the bottom plate cover 122 and the base plate 130 is covered with the rear cover 124. Therefore, the seat supporting member 120 can be prevented from being visually observed from the outside, and the appearance can be improved. Further, since the decorative plate 123 is provided on the base plate 130, the base plate 130 can be prevented from being exposed upwardly through the cover opening 156a as depicted in FIG. 24. Thus, the appearance can be improved.

Further, since a front portion of the base plate 130 is disposed in the rear end side recessed portion 45d of the main seat 45 and covered from the outer sides with the rear projections 76, the base plate 130 can be hidden by the rear projections 76, and the appearance can be improved. Further, since the rear seat 46 moves forwardly and rearwardly through the rear end side recessed portion 45d of the main seat 45, even if the position of the main seat 45 is not changed, only the rear seat 46 can be independently moved forwardly and rearwardly.

Further, the user can change, after moving the rear seat 46 forwardly or rearwardly as depicted in FIG. 26, the state of the rear seat 46 into the seating posture by an operation of the operation portion 145. In this case, the position of the rear seat 46 in the seating posture in the forward and rearward direction can be adjusted. Therefore, the position of the rear seat 46 in the forward and rearward direction can be changed easily in accordance with the physique or the like of the passenger to be seated on the rear seat 46.

As described above, with the embodiment to which the present invention is applied, the motorcycle 1 includes a head pipe 12, a pair of left and right main frames 13L and 13R provided behind the head pipe 12, pivot frames 14L and 14R connected to a rear end of the main frames 13L and 13R and connecting to seat frames 15L and 15R. A fuel tank 41 is provided between the main frames 13L and 13R, and a main seat 45 for being seated by a rider is removably provided behind the fuel tank 41. Further, an upper cross frame 23 for connecting the pivot frames 14L and 14R to each other is provided, and a catching mechanism portion 83 for catching an engaging portion 77 provided on the main seat 45 is provided on the upper cross frame 23. A pair of arm portions 74 extending sidewardly from a rear face of the fuel tank 41 are provided on the main seat 45, and positioning protrusions 78b projecting downwardly are provided on the arm portions 74. When the main seat 45 is attached, the positioning protrusions 78b are fitted into positioning openings 94 as receiving portions formed at an upper portion of the main frames 13L and 13R. In particular, since the pair of left and right arm portions 74 of the main seat 45 extending to side faces of the fuel tank 41 are fitted with the positioning protrusions 78b of the main frames 13L and 13R, even if the front end of the main seat 45 and the catching mechanism portion 83 are spaced away from each other, the front end of the main seat 45 can be positioned appropriately in the positioning openings 94. Therefore, spreading of the main seat 45 in a lateral direction can be suppressed, and the main seat 45 and center side covers 49L and 49R which are exterior parts can be joined together appropriately.

Further, since the positioning openings 94 are provided on connection plates 90 welded to the main frames 13L and 13R, by providing the connection plates 90 with the position thereof adjusted, the position of the positioning openings 94 can be adjusted readily and the positioning protrusions 78b can be fitted appropriately into the positioning openings 94.

Further, since the connection plates 90 integrally include a cover holding plate portion 93a for holding the center side covers 49L and 49R in the proximity of the positioning openings 94, there is no necessity to provide a separate part for holding the cover holding plate portion 93a. Therefore, the number of parts can be reduced. Further, the positioning accuracy between the main seat 45 and the center side covers 49L and 49R can be improved.

Furthermore, since the positioning protrusions 78b have a substantially square shape and the positioning openings 94 have a substantially rectangular shape elongated in the forward and rearward direction as viewed in plan, the load can be received by surfaces of the positioning openings 94 and the positioning protrusions 78b. Consequently, the load can be distributed. Therefore, it is possible to reduce the thickness of the connection plates 90 or the like to achieve a reduction in the weight. Further, since the positioning openings 94 escape forwardly and rearwardly with respect to the positioning protrusions 78b, management of the accuracy in dimension is facilitated.

The main seat 45 is inserted and connected at a rear portion thereof in and to a rear cross frame 25 provided on the seat frames 15L and 15R, and when the main seat 45 is moved around the connection portion 101, the engaging portion 77 is fitted into and locked by the catching mechanism portion 83. In a configuration wherein the main seat 45 is pivoted around the connection portion 101 at a rear portion thereof, the assembly error of a front portion of the main seat 45 is great. However, since the positioning protrusions 78b at a front portion of the main seat 45 are fitted in the positioning openings 94, the front portion of the main seat 45 can be fixed appropriately. Further, since the positioning openings 94 have a rectangular shape while the positioning protrusions 78b have a substantially square shape, an assembly error can be absorbed.

Further, a rear seat 46 is provided behind the main seat 45, and a rear end side recessed portion 45d of a substantially U-shape as viewed in plan and in front elevation is provided on a rear end edge 75 of the main seat 45. Further, a front end 46a of the rear seat 46 is disposed in the rear end side recessed portion 45d. Therefore, the length of a seat 10 in the forward and rearward direction can be suppressed, and the height of the rear seat 46 can be made lower.

Further, with the embodiment to which the present invention is applied, the motorcycle 1 includes a head pipe 12, a pair of left and right main frames 13L and 13R provided behind the head pipe 12, seat frames 15L and 15R extending to the rear of the main frames 13L and 13R, a main seat 45 for being seated by a rider, and a rear seat 46 provided behind the main seat 45 and formed as a separate member from the main seat 45. The rear seat 46 is connected to rear seat holding portions 112L and 112R provided at a rear portion of the seat frames 15L and 15R through a base plate 130 which holds the rear seat 46 therein, and the base plate 130 is configured such that it can be fixed in a plurality of positional states different in the forward and rearward direction with respect to the rear seat holding portions 112L and 112R. Consequently, only the rear seat 46 can be moved forwardly and rearwardly. Consequently, by changing the position of the base plate 130 from among the plurality of positional states different from each other in the forward and rearward direction with respect to the rear seat holding portions 112L and 112R and fixing the base plate 130, the rear seat 46 can be moved readily in the forward or rearward direction without changing the position of the main seat 45. Therefore, while a good ride comfort of the main seat to the rider is assured, the ride comfort of the rear seat to the passenger can be improved.

Further, the base plate 130 is disposed between the pair of left and right seat frames 15L and 15R as viewed in plan and includes a plurality of plate side openings 134 juxtaposed in the forward and rearward direction. The rear seat holding portions 112L and 112R include a plurality of openings 113 provided at positions on the inner side of the seat frames 15L and 15R in the vehicle widthwise direction and juxtaposed in the forward and rearward direction. The base plate 130 and the rear seat holding portions 112L and 112R are fixed by a plurality of base plate fixing bolts 155 fitted in the plate side openings 134 and the openings 113. Therefore, by changing the position at which the plate side openings 134 are fixed to a plurality of openings 113, juxtaposed in the forward and rearward direction, of the rear seat holding portions 112L and 112R by the base plate fixing bolts 155, the rear seat 46 can be moved readily in the forward or rearward direction. Further, since the plurality of base plate fixing bolts 155 are used for the fixation, the rear seat 46 can be fixed firmly.

Further, since a decorative plate 123 which covers the base plate 130 from above is locked to the base plate 130, even if the base plate 130 is in a moved state, the base plate 130 can be prevented from being exposed, and the appearance can be improved.

Furthermore, the base plate 130 has a substantially H-shape as viewed in a plan view. Since the decorative plate 123 is caught by left and right front arm portions 148 of the base plate 130 and a rear locking portion 152 of a rear portion of the decorative plate 123 is locked to the base plate 130, the decorative plate 123 can be removed and mounted readily by locking and unlocking the rear locking portion 152.

Further, shaft portions 132L and 132R are provided at a front portion of the base plate 130, and the rear seat 46 can be pivoted to an upright posture around the shaft portions 132L and 132R and can be moved forwardly and rearwardly together with the base plate 130. Therefore, by uprightly erecting the rear seat 46, the rear seat 46 can be used as a back rest for the rider, and by moving the rear seat 46 forwardly or rearwardly while the rear seat 46 is in the state of a back rest, the ride comfort to the rider can be adjusted.

Further, seat belt fixing portions 144 are provided at left and right positions on the outer sides of the shaft portions 132L and 132R in the vehicle widthwise direction, and a seat belt 143 of the rear seat 46 is fixed to the seat belt fixing portions 144 while the seat belt 143 includes load hanging hook portions 143a. Therefore, the seat belt 143 can be prevented from making an obstacle to movement of the rear seat 46. Further, even in a configuration wherein it is difficult to provide a load hanging hook on the vehicle body side, a load hanging hook can be provided.

Further, a rear end portion cross frame 26 for connecting rear ends of the pair of left and right seat frames 15L and 15R to each other is provided. Further, a forward projection 115a which is positioned in a region of a rear side recessed portion 130b of the base plate 130 in a state in which the base plate 130 is positioned at a rearmost end position is provided at a front end at the center in the vehicle widthwise direction of the rear end portion cross frame 26. Therefore, the rear end portion cross frame 26 can be formed longer in the forward or rearward direction by a distance corresponding to the size of the forward projection 115a, and the strength and the rigidity of the rear end portion cross frame 26 can be improved. Further, even in a state in which the rear seat 46 is moved to the front, the load of the rear seat 46 can be received by the forward projection 115a.

Furthermore, a rear cover 124 is provided for covering rear portions of the seat frames 15L and 15R, the base plate 130, the decorative plate 123 and the rear end portion cross frame 26 from above. Further, the rear cover 124 has a cover side forward projection 124a for covering the region of the rear side recessed portion 130b of the base plate 130 from above in a state in which the base plate 130 is positioned at a frontmost end position. Therefore, even in a state in which the base plate 130 is positioned at the frontmost end, the region of the rear side recessed portion 130b can be hidden by the cover side forward projection 124a, and the appearance is good.

Further, a rear end side recessed portion 45d of a substantially U-shape as viewed in plan and in front elevation is provided on the main seat 45, and a front end 46a of the rear seat 46 and the base plate 130 are disposed in the rear end side recessed portion 45d. Therefore, the length of the main seat 45 and the rear seat 46 in the forward and rearward direction can be suppressed and the height of the rear seat 46 can be made lower. Further, it is possible to dispose the base plate 130 in the rear end side recessed portion 45d to hide the base plate 130, and the appearance can be improved.

Further, since the front end 46a of the rear seat 46 is disposed at a position wherein it overlaps with a rear end of the main seat 45 from above as viewed in a plan view, the main seat 45 does not make an obstacle, and only the rear seat 46 can be moved forwardly and rearwardly while the main seat 45 remains fixed.

It is to be noted that the embodiment described hereinabove indicates a mode to which the present invention is applied, and the present invention is not limited to the embodiment described above.

While, in the embodiment described above, the tank-like member is described taking the fuel tank 41 as an example, the present invention is not limited to this, but only it is necessary for the tank-like member to be visually recognized that it is like a tank. The tank-like member may be, for example, an air cleaner box or an accommodation box.

Further, while it is described in the foregoing description of the embodiment that the base plate 130 is moved forwardly or rearwardly by changing the position at which the plate side openings 134 are fixed to the plurality of openings 113, which are juxtaposed in the forward and rearward direction, of the rear seat holding portions 112L and 112R by the base plate fixing bolts 155, the present invention is not limited to this. For example, the base plate may be configured for sliding movement in the forward and rearward direction through a rail member extending in the forward and rearward direction such that the position of the rear seat 46 in the forward and rearward direction can be adjusted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle, comprising;
   a head pipe;
   a main frame provided behind the head pipe;
   a seat rail extending to the rear of the main frame;
   a rear seat holding portion provided at a rear portion of the seat rail, the rear seat holding portion having a plurality of apertures;
   a main seat;
   a rear seat provided behind the main seat and formed as a separate member from the main seat;
   a rear seat base plate for holding the rear seat thereon, the rear seat base plate including a plurality of apertures; and
   said rear seat being moveable forwardly and rearwardly by affixing the rear seat base plate at one of a plurality of positions in a forward and rearward direction with respect to the rear seat holding portion by securing the rear seat holding portion to the rear seat base plate by fasteners extending through the apertures of the rear seat portion aligned with apertures of the rear seat base plate.

2. The saddle vehicle according to claim 1,
   further comprising a left seat rail and a right seat rail,
   wherein the rear seat base plate is disposed between the pair of seat rails as viewed in a plan view;
   wherein the rear seat holding portion is provided at a position on an inner side of the pair of seat rails in a vehicle widthwise direction.

3. The saddle vehicle according to claim 1, wherein a decorative plate for covering the rear seat base plate from above is locked to the rear seat base plate.

4. The saddle vehicle according to claim 1, wherein a front end of the rear seat is disposed at a position at which the front end overlaps with a rear end of the main seat from above as viewed in a plan view.

5. The saddle vehicle according to claim 1, wherein the apertures of the rear seat base plate comprise two rows of apertures extending in a front to rear direction.

6. The saddle vehicle according to claim 1, wherein the apertures of the rear seat holding portion comprise two rows of apertures extending in a front to rear direction.

7. The saddle vehicle according to claim 1, wherein a shaft portion is provided at a front portion of the rear seat base plate, and the rear seat can be pivoted to an upright posture around the shaft portion and can be moved forwardly and rearwardly together with the rear seat base plate.

8. The saddle vehicle according to claim 1, wherein a recessed portion having a substantially U-shape as viewed in a plan view and in front elevation is provided on a rear end edge of the main seat, and a front end of the rear seat and the rear seat base plate are disposed in the recessed portion.

9. A saddle vehicle, comprising;
   a head pipe;
   a main frame provided behind the head pipe;
   a seat rail extending from a rear of the main frame;
   a rear seat holding portion provided at a rear portion of the seat rail;
   a main seat and a rear seat provided behind the main seat and formed as a separate member from the main seat;
   a rear seat base plate for holding the rear seat thereon; and
   said rear seat being moveable forwardly and rearwardly by affixing the rear seat base plate at a plurality of positions in a forward and rearward direction with respect to the rear seat holding portion,
   wherein the rear seat base plate has a substantially H-shape as viewed in a plan view, and a decorative plate is caught by left and right arm portions at a front portion of the rear seat base plate while a rear recessed portion of the decorative plate is locked to the rear seat base plate.

10. The saddle vehicle according to claim 9, wherein the seat rails are provided in left and right pair and a cross plate for connecting rear ends of the seat rails to each other is provided, and a forward projection is provided at a front end at the center in the vehicle widthwise direction of the cross plate so as to be positioned in a region of a recessed portion of the rear seat base plate in a state in which the rear seat base plate is positioned at a rearmost end position.

11. The saddle vehicle according to claim 10, wherein:
a rear cover is provided for covering rear portions of the pair of left and right seat rails, the rear seat base plate, the decorative plate and the cross plate from above; and
on the rear cover, a cover side forward projection is provided for covering a region of the recessed portion of the rear seat base plate from above in a state in which the rear seat base plate is positioned at a frontmost end position.

12. A saddle vehicle, comprising;
a head pipe;
a main frame provided behind the head pipe;
a seat rail extending from a rear of the main frame;
a rear seat holding portion provided at a rear portion of the seat rail;
a main seat and a rear seat provided behind the main seat and formed as a separate member from the main seat;
a rear seat base plate for holding the rear seat thereon; and
said rear seat being moveable forwardly and rearwardly by affixing the rear seat base plate at a plurality of positions in a forward and rearward direction with respect to the rear seat holding portion,
wherein a shaft portion is provided at a front portion of the rear seat base plate, and the rear seat can be pivoted to an upright posture around the shaft portion and can be moved forwardly and rearwardly together with the rear seat base plate.

13. The saddle vehicle according to claim 12, wherein a seat belt fastening portion is provided at left and right positions on the outer sides of the shaft portion in the vehicle widthwise direction and a seat belt of the rear seat is fixed to the seat belt fastening portions, and the seat belt includes a load hanging hook.

14. The saddle vehicle according to claim 12, wherein a front end of the rear seat is disposed at a position at which the front end overlaps with a rear end of the main seat from above as viewed in a plan view.

15. A saddle vehicle, comprising;
a head pipe;
a main frame provided behind the head pipe;
a seat rail extending from a rear of the main frame;
a rear seat holding portion provided at a rear portion of the seat rail;
a main seat and a rear seat provided behind the main seat and formed as a separate member from the main seat;
a rear seat base plate for holding the rear seat thereon; and
said rear seat being moveable forwardly and rearwardly by affixing the rear seat base plate of positions in a forward and rearward direction with respect to the rear seat holding portion,
wherein a recessed portion having a substantially U-shape as viewed in a plan view and in front elevation is provided on a rear end edge of the main seat, and a front end of the rear seat and the rear seat base plate are disposed in the recessed portion.

* * * * *